(12) United States Patent
Salem et al.

(10) Patent No.: US 11,949,576 B2
(45) Date of Patent: Apr. 2, 2024

(54) TECHNOLOGIES FOR OUT-OF-ORDER NETWORK PACKET MANAGEMENT AND SELECTIVE DATA FLOW SPLITTING

(71) Applicant: Intel Corporation, Santa Clara, CA (US)

(72) Inventors: Ahmed Soud Salem, Ottobrunn (DE); Jerome Parron, Fuerth (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/047,936

(22) Filed: Oct. 19, 2022

(65) Prior Publication Data

US 2023/0216767 A1     Jul. 6, 2023

Related U.S. Application Data

(63) Continuation of application No. 16/957,627, filed as application No. PCT/US2019/027687 on Apr. 16, 2019, now Pat. No. 11,483,225.

(Continued)

(51) Int. Cl.
*H04L 43/0864*     (2022.01)
*H04L 43/026*     (2022.01)
(Continued)

(52) U.S. Cl.
CPC ........ *H04L 43/0864* (2013.01); *H04L 43/026* (2013.01); *H04L 43/087* (2013.01);
(Continued)

(58) Field of Classification Search
CPC ... H04L 43/0864; H04L 43/028; H04L 43/20; H04L 43/0811; H04L 43/026; H04W 24/08; H04W 72/0453
See application file for complete search history.

(56) References Cited

U.S. PATENT DOCUMENTS 11,012,367 B2    5/2021    Steffen et al.
11,483,225 B2    10/2022    Salem et al.
(Continued)

FOREIGN PATENT DOCUMENTS

WO    2017078258    5/2017
WO    2017196386    11/2017

OTHER PUBLICATIONS

3GPP TS 23.501 v 17.7.0, "3rd Generation Partnership Project; Technical Specification Group Services and System Aspects; System architecture for the 5G System (5GS); Stage 2 (Release 17)," Dec. 2022, 573 pages.

(Continued)

*Primary Examiner* — Kyung H Shin
(74) *Attorney, Agent, or Firm* — Hanley, Flight & Zimmerman, LLC

(57) ABSTRACT

Technologies for providing out-of-order network packet management and selective data flow splitting include a computing device. The computing device includes circuitry to identify a service data flow associated with a set of packets to be sent to a recipient computing device. The circuitry is also to determine a target quality of service for the service data flow, determine, as a function of the target quality of service, one or more radio links on which to send the packets, including determining whether to split the service data flow over multiple radio links, and send the packets through the determined one or more radio links.

20 Claims, 15 Drawing Sheets

Related U.S. Application Data

(60) Provisional application No. 62/659,125, filed on Apr. 17, 2018.

(51) Int. Cl.
| | | |
|---|---|---|
| *H04L 43/087* | (2022.01) | |
| *H04L 43/0876* | (2022.01) | |
| *H04L 47/125* | (2022.01) | |
| *H04L 47/24* | (2022.01) | |
| *H04L 69/22* | (2022.01) | |
| *H04L 69/329* | (2022.01) | |
| *H04W 72/0453* | (2023.01) | |

(52) U.S. Cl.
CPC ........ *H04L 43/0876* (2013.01); *H04L 47/125* (2013.01); *H04L 47/24* (2013.01); *H04L 69/22* (2013.01); *H04L 69/329* (2013.01); *H04W 72/0453* (2013.01)

(56) References Cited

U.S. PATENT DOCUMENTS

| | | | |
|---|---|---|---|
| 2008/0056273 | A1 | 3/2008 | Pelletier et al. |
| 2008/0192752 | A1 | 8/2008 | Hyslop et al. |
| 2010/0312941 | A1 | 12/2010 | Aloni et al. |
| 2015/0296418 | A1 | 10/2015 | Szilagyi et al. |
| 2016/0080272 | A1 | 3/2016 | McNaughton et al. |
| 2017/0105227 | A1 | 4/2017 | Pinheiro et al. |
| 2017/0187629 | A1 | 6/2017 | Shalev et al. |
| 2017/0303287 | A1 | 10/2017 | Yu et al. |
| 2017/0353874 | A1* | 12/2017 | Harrang .............. H04L 43/0864 |
| 2018/0359802 | A1 | 12/2018 | Cho et al. |
| 2019/0150150 | A1* | 5/2019 | Calin ................ H04W 72/0453 370/329 |
| 2020/0100324 | A1 | 3/2020 | Wittberg et al. |

OTHER PUBLICATIONS

3GPP TS 23.501 v 16.0.2, "3rd Generation Partnership Project; Technical Specification Group Services and System Aspects; System Architecture for the 5G System; Stage 2 (Release 16)," Apr. 2019, 317 pages.

3GPP TS 23.501 v 17.0.0, "3rd Generation Partnership Project; Technical Specification Group Services and System Aspects; System architecture for the 5G System (5GS); Stage 2 (Release 17)," Mar. 2021, 489 pages.

Active Queue Management with Dual Virtual Proportional Integral Queues for TCP Uplink/Downlink Fairness in Infrastructure WLANs. Qiuyan Xia, Student Member, IEEE, Xing Jin, Student Member, IEEE, and Mounir Hamdi, Senior Member, IEEE. Year Published: 2008. (Year: 2008).

PCT, "International Search Report," issued in connection with Application No. PCT/US2019/027687 dated Aug. 2, 2019, 3 pages.

United States Patent and Trademark Office, "Non-Final Office Action," dated Aug. 6, 2019, issued in related U.S. Appl. No. 15/941,428, 32 pages.

United States Patent and Trademark Office, "Final Office Action," dated Dec. 11, 2019, issued in related U.S. Appl. No. 15/941,428, 27 pages.

United States Patent and Trademark Office, "Non-Final Office Action," dated Jun. 15, 2020, issued in related U.S. Appl. No. 15/941,428, 28 pages.

United States Patent and Trademark Office, "Final Office Action," dated Aug. 17, 2020, issued in related U.S. Appl. No. 15/941,428, 29 pages.

United States Patent and Trademark Office, "Notice of Allowance," dated Jan. 14, 2021, issued in related U.S. Appl. No. 15/941,428, 12 pages.

United States Patent and Trademark Office, "Non-Final Rejection," issued in connection with U.S. Appl. No. 16/957,627 dated Jul. 29, 2021, 11 pages.

United States Patent and Trademark Office, "Notice of Allowance and Fee(s) Due," issued in connection with U.S. Appl. No. 16/957,627 dated Feb. 18, 2022, 8 pages.

United States Patent and Trademark Office, "Notice of Allowance and Fee(s) Due," issued in connection with U.S. Appl. No. 16/957,627 dated Jun. 24, 2022, 7 pages.

International Searching Authority, "Written Opinion of the International Searching Authority," issued in connection with Application No. PCT/US2019/027687 dated Aug. 2, 2019, 7 pages.

* cited by examiner

TECHNOLOGIES FOR OUT-OF-ORDER NETWORK PACKET MANAGEMENT AND SELECTIVE DATA FLOW SPLITTING

CROSS-REFERENCE TO RELATED APPLICATIONS

This patent arises from a continuation of U.S. patent application Ser. No. 16/957,627, filed on Jun. 24, 2020, which corresponds to the U.S. national stage of International Patent Application No. PCT/US2019/027687, filed on Apr. 16, 2019, which claims the benefit of U.S. Provisional Patent Application No. 62/659,125, filed on Apr. 17, 2018. Priority to U.S. patent application Ser. No. 16/957,627, International Patent Application No. PCT/US2019/027687 and U.S. Provisional Patent Application No. 62/659,125 is claimed. U.S. patent application Ser. No. 16/957,627, International Patent Application No. PCT/US2019/027687 and U.S. Provisional Patent Application No. 62/659,125 are hereby incorporated herein by reference in their respective entireties.

BACKGROUND

Modern computing devices have become ubiquitous tools for personal, business, and social uses. As such, many modern computing devices are capable of wirelessly connecting to various data networks, including the Internet, to transmit and receive data communications over the various data networks. To facilitate communications between computing devices, the data networks typically include one or more network computing devices (e.g., gateways, switches, routers, servers, etc.) to route communications to, through, and from the networks. For example, a cellular network operator (i.e., a wireless service provider/carrier) may provide access to their wireless network infrastructure to one or more network-enabled endpoint devices, such as a smartphone that has a data plan with that cellular network operator. Accordingly, such network-enabled endpoint devices typically include hardware capable of facilitating such wireless communications, such as a baseband subsystem including one or more modems and cellular processors.

Generally, such wireless communications are susceptible to high bit error rates, typically resulting from the mobility of wirelessly connected devices where link quality and bandwidth can rapidly change, unstable communication channel characteristics, collisions, noise, etc. As such, the performance of wireless communication protocols, such as Transmission Control Protocol/Internet Protocol (TCP/IP), can be perceptively degraded. The degradation can be compounded by TCP's inability to distinguish the root cause of packet loss (e.g., network congestion vs. transmission errors). While error recovery technologies have been developed to minimize the effect of utilizing wireless communication channels, such as the forward error correction (FEC) coding and Automatic Repeat reQuest (ARQ) mechanisms, network packets can still be lost and retransmitted or transmitted via different routing paths through a network, which can result in certain network packets being received out of order.

In some instances, a service data flow may be split between multiple radio links. For example, in an anchor-booster approach (e.g., in a 5G system), control signaling and part of the data transfer is managed on a long term evolution (LTE) cell and if the user equipment (e.g., cellular phone) is under coverage of a 5G NodeB, the LTE NodeB can configure the data radio bearer to use both LTE and EUTRAN-NR radio technology in parallel. The user equipment can then send data on both radio links. The consequence is that the split portions of the service data flow can have different latencies resulting from the characteristics of the radio links on which they are sent. The receiver (e.g., the computing device that receives the packets) waits for all packets to be received in order to reorder the packets for the service data flow, even if Packet Data Convergence Protocol (PDCP) reordering is disabled. This leads to a performance degradation as the receiver will wait for packet(s) from the radio link with the highest latency, resulting in a bursty (e.g., high jitter) delivery to the receiver.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION

Figure 1:
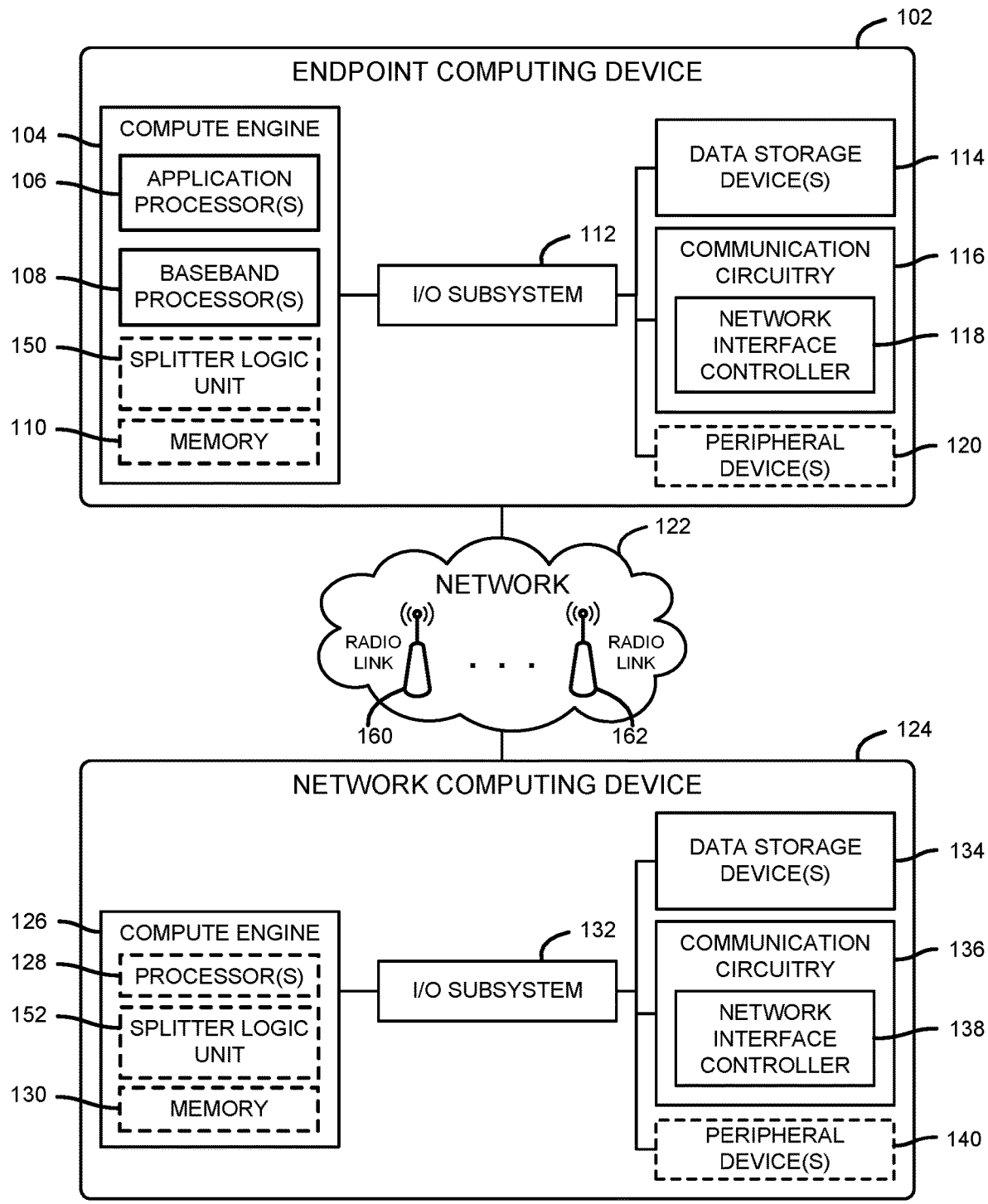
FIG. 1 is a simplified block diagram of at least one embodiment of a system for managing out-of-order network packets and selective data flow splitting that includes an endpoint computing device communicatively coupled to a network computing device via a network.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. Furthermore, the disclosed embodiments may be initially encoded as a set of preliminary instructions (e.g., encoded on a machine-readable storage medium) that may require preliminary processing operations to prepare the instructions for execution on a destination device. The preliminary processing may include combining the instructions with data present on a device, translating the instructions to a different format, performing compression, decompression, encryption, and/or decryption, combining multiple files that include different sections of the instructions, integrating the instructions with other code present on a device, such as a library, an operating system, etc., or similar operations. The preliminary processing may be performed by the source compute device (e.g., the device that is to send the instructions), the destination compute device (e.g., the device that is to execute the instructions), or an intermediary device. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for managing out-of-order network packets in multi-processor architectures includes an endpoint computing device 102 communicatively coupled to a network computing device 124 via a network 122. In some embodiments, the endpoint computing device 102 and/or the network computing device 124 may be embodied as one or more physical compute devices or a virtualized system (e.g., one or more functions executed in virtualized environment(s), such as virtual machine(s) or container(s), in which the underlying hardware resources appear as physical hardware to software executing in the virtualized environment(s), but are separated from the software by an abstraction layer). In use, the endpoint computing device 102 transmits and receives network traffic (e.g., network packets, frames, etc.) to/from the network computing device 124. In response to receiving network traffic, the endpoint computing device 102 may undertake some action, such as perform a computation, interpret a result, store at least a portion of the payload, etc., subsequent to having undertaken some level of processing on at least a portion of the received network packet(s) (e.g., at least a portion of the header, the payload, etc.). Similarly, as a result of having received a network packet, the network computing device 124 may perform some computation, respond to the received network packet, and/or forward the network packet to a subsequent target computing device, typically after undertaking some level of processing on at least a portion of the received network packet (e.g., at least a portion of the header, the payload, etc.).

Such network-enabled computing devices are often mobile and rely on wireless communication protocols (e.g., TCP/IP) to transmit the network packets wirelessly from one computing device to another over the network 122, which may include multiple radio links 160, 162 (e.g., communication paths through which packets may be communicated and which may be based on different radio technologies, such as 5G, LTE, 3G, Wi-Fi, etc.). As such, under certain conditions, network packets may be lost, delayed, or otherwise unable to reach their destination. To address this problem, various error recovery technologies have been developed. For example, Automatic Repeat reQuest (ARQ) mechanisms are used as an error recovery scheme in Layer 2 of wireless networks. However, some network packets may be received out of order (i.e., out of sequential order), which can result in those out of order network packets not being delivered to upper layers (i.e., upper layers of the Open Systems Interconnection (OSI) model). In turn, this can result in the delayed processing of network packets, as a blocking condition occurs until the network packets can be reordered (i.e., subsequent to having received the missing network packet(s)).

However, certain types of network packets (e.g., packet data convergence protocol (PDCP) interspersed feedback packets to a Robust Header Compression (RoHC) compressor) can be processed out of order without delay and without introducing potential complications. As such, the endpoint computing device 102 is configured to identify those network packets which can be processed by an application out of order (e.g., based on an associated flow, workload, payload data, source, or some other identifying property), or otherwise be delivered to the next level layer for processing regardless of whether the received network packets are in-order or out-of-order.

The endpoint computing device 102, or more particularly a baseband processor 108 of the endpoint computing device 102, is configured to deliver received out of sequence network packets to applications executing thereon while maintaining a Packet Data Convergence Protocol (PDCP) window for different radio access technologies. To do so, the baseband processor 108 is configured to exchange metadata between the baseband processor 108 and an application processor 106 to enable reordering of data link layer (i.e., layer 2 of the OSI model) data of the network packet by the application processor 106. Additionally, the endpoint computing device 102 is configured to enable a flow control mechanism between the application processor 106 and baseband processor 108, such as may be needed in the case of a memory limitation in the baseband processor 108, to indicate that the baseband processor 108 is to perform the data link layer reordering while the flow control condition exists. It should be appreciated that, in some embodiments, the reordering functionality may be split between the baseband processor 108 and the application processor 106, such as may be based on available resources at a given point in time. Furthermore, and as discussed in more detail herein, each computing device 102, 124 may determine whether packets that are to be sent from a corresponding application (e.g., an application executed by the application processor 106) to a recipient computing device (e.g., from the endpoint computing device 102 to the network computing device 124 or vice versa) should utilize a single radio link 160, 162 or be split across multiple radio links 160, 162. In the illustrative embodiment, the determination is made based on a target quality of service associated with the application (e.g., associated with the service data flow for the application), such as a set of acceptable latency and/or jitter thresholds. In the illustrative embodiment, if an application is sensitive to latency or jitter (e.g., the target quality of service for the application indicates a latency that satisfies (e.g., is less than) a reference latency or a jitter that satisfies (e.g., is less than) a reference jitter), the computing device 102, 124 may determine to send the packets through just one of the available radio links 160, 162. Otherwise (e.g., if the application is not sensitive to latency or jitter), the computing device 102, 124 may determine to split the service data flow over multiple radio links 160, 162. Other factors, such as load balancing among the available radio links 160, 162 may also be considered in the determination, as described in more detail herein. As such, as compared to other systems, the system 100 enables a more efficient distribution of transmission delays based on service data flow (SDF) quality of service (QOS) requirements. In doing so, the system 100 helps to reduce the jitter per service data flow. Indeed, by avoiding a split of a service data flow across multiple radio links, the service data flow is impacted only by the jitter of one of the radio links instead of being impacted by the combination of multiple radio links with different jitter and delay characteristics, given that splitting the service data flow may introduce jitter due to unbalanced delays among various radio links.

In some embodiments, the sending computing device (e.g., endpoint computing device 102 or a network computing device 124) may define the following application categories: category A, which may be robust to out of order delivery; category B, which is not robust to out of order delivery and is sensitive to delay and/or jitter; and category C, which is not robust to out of order deliver and is not sensitive to delay and/or jitter. For category A, the corresponding application can handle data reception if the packets are out of order. As such, no layer 2 reordering is required for applications falling into category A. For category B, the application will receive data in sequence and L2/L3/L4 reordering will be performed, independently or combined. Further, given that the application is sensitive to delay and jitter, the data is delivered as early as possible and the source of the jitter will be minimized. For category C, L2/L3/L4 reordering will be performed, independently or combined. Given that an application in category C is not sensitive to delay, any delay or jitter introduced by the reordering function is not critical.

The endpoint computing device 102 may be embodied as any type of computation or computer device capable of performing the functions described herein, including, without limitation, a mobile computing device (e.g., a smartphone, a tablet computer, a laptop computer, a notebook computer, etc.), an Internet of Things (IoT) device (e.g., a wearable device, a smart device, a smart vehicle, etc.), etc. It should be appreciated that, while only a single endpoint computing device 102 is illustratively shown, the system 100 may include additional endpoint computing devices 102 communicatively coupled to the network computing device 124, in other embodiments.

As shown in FIG. 1, the illustrative endpoint computing device 102 includes a compute engine 104, an I/O subsystem 112, one or more data storage devices 114, communication circuitry 116, and, in some embodiments, one or more peripheral devices 120. It should be appreciated that the endpoint computing device 102 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component.

The compute engine 104 may be embodied as any type of device or collection of devices capable of performing the various compute functions as described herein. In some embodiments, the compute engine 104 may be embodied as a single device such as an integrated circuit, an embedded system, a field-programmable-array (FPGA), a system-on-a-chip (SOC), an application specific integrated circuit (ASIC), reconfigurable hardware or hardware circuitry, or other specialized hardware to facilitate performance of the functions described herein. In the illustrative endpoint computing device 102, the compute engine 104 includes one or more central processing units (CPUs), referred to herein as application processors 106, one or more baseband processors 108, a splitter logic unit 150, and, in some embodiments, memory 110.

The application processor(s) 104 may be embodied as any type of processor capable of performing the functions described herein. For example, the application processor(s) 104 may be embodied as one or more single-core processors, multi-core processors, digital signal processors (DSPs), microcontrollers, or other processor or processing/controlling circuit(s). In some embodiments, the application processor(s) 104 may be embodied as, include, or otherwise be coupled to a field programmable gate array (FPGA), an application specific integrated circuit (ASIC), reconfigurable hardware or hardware circuitry, or other specialized hardware to facilitate performance of the functions described herein. It should be appreciated that the functionality of the application processor 106 is distinct from the baseband processor 108. For example, the application processor 106 is generally configured to manage the user interfacing (UI) software applications, manage power allocation and rendering the UI to a screen coupled/integrated to the endpoint computing device 102, and function as a networking interface for the applications being executed thereon. The baseband processor 108 is configured to provide and control an interface to the network 122.

The baseband processor(s) 108 may be embodied as any type of processor capable of performing the functions described herein. For example, each of the one or more baseband processors 108 may include a modem (not shown) to modulate and demodulate a radio signal and a protocol stack processor (not shown) which is configured to manage the network communications to and from the endpoint computing device 102 by establishing connections (e.g., via the physical and/or virtual interfaces of the communication circuitry 116), managing radio resources, handling errors, and packetizing incoming and outgoing data. In some embodiments, one or more of the baseband processors 108 may include an integrated memory (not shown), such as flash memory, SRAM, etc., integrated power-management capabilities, and, in some embodiments, one or more peripherals. In such embodiments, the integrated memory and baseband processor 108 may form a complete SOC (e.g., for advanced cellular networks).

The splitter logic unit 150 may be embodied as any type of device or circuitry (e.g., a co-processor, reconfigurable circuitry, an application specific integrated circuit (ASIC), etc. or virtualized version thereof) configured to identify a service data flow associated with a set of packets to be sent to a recipient computing device, determine a target quality of service for the service data flow, determine, as a function of the target quality of service, one or more radio links on which to send the packets, and coordinate with other components of the endpoint computing device (e.g., the baseband processor 108) to send the packets through the determined one or more radio links. In some embodiments, the splitter logic unit 150 may be integrated into another component of the endpoint computing device (e.g., in the baseband processor 108). In other embodiments, the splitter logic unit 150 may be divided into separate logic units (e.g., devices or circuitry) capable of performing the operations described above.

The memory 110 may be embodied as any type of volatile (e.g., dynamic random access memory (DRAM), etc.) or non-volatile memory or data storage capable of performing the functions described herein. It should be appreciated that the memory 110 may include main memory (i.e., a primary memory) and/or cache memory (i.e., memory that can be accessed more quickly than the main memory). Volatile memory may be a storage medium that requires power to maintain the state of data stored by the medium. Non-limiting examples of volatile memory may include various types of random access memory (RAM), such as dynamic random access memory (DRAM) or static random access memory (SRAM).

The compute engine 104 is communicatively coupled to other components of the endpoint computing device 102 via the I/O subsystem 112, which may be embodied as circuitry and/or components to facilitate input/output operations with the application processor(s) 106, the baseband processor 108, the memory 110, and other components of the endpoint computing device 102. For example, the I/O subsystem 112 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 112 may form a portion of a system-on-a-chip (SoC) and be incorporated, along with one or more of the application processor(s) 106, the baseband processor 108, the memory 110, and other components of the endpoint computing device 102, on a single integrated circuit chip.

The one or more data storage devices 114 may be embodied as any type of storage device(s) configured for short-term or long-term storage of data, such as, for example, memory devices and circuits, memory cards, hard disk drives, solid-state drives, or other data storage devices. Each data storage device 114 may include a system partition that stores data and firmware code for the data storage device 114. Each data storage device 114 may also include an operating system partition that stores data files and executables for an operating system. As described previously, the functionality of the application processor 106 is distinct from the baseband processor 108. Accordingly, it should be appreciated that the baseband processor 108 typically uses a different operating system than the application processor(s) 106. Accordingly, in such embodiments, the operating system of the application processor(s) 106 may be stored in a different location (e.g., the data storage device 114) than the operating system of the baseband processor 108 (e.g., the memory 110).

The communication circuitry 116 may be embodied as any communication circuit, device, or collection thereof, capable of enabling communications between the endpoint computing device 102 and other computing devices, such as the network computing device 124, as well as any network communication enabling devices, such as an access point, network switch/router, etc., to allow communication over the network 122. Accordingly, the communication circuitry 116 may be configured to use any one or more communication technologies (e.g., wireless or wired communication technologies) and associated protocols (e.g., Ethernet, Bluetooth®, Wi-Fi®, 3G, WiMAX, LTE, 5G, etc.) to effect such communication.

It should be appreciated that, in some embodiments, the communication circuitry 116 may include specialized circuitry, hardware, or combination thereof to perform pipeline logic (e.g., hardware algorithms) for performing the functions described herein, including performing at least a portion of the processing/generation of network packets as described herein, performing offloaded computational functions, etc. In some embodiments, performance of one or more of the functions of communication circuitry 116 as described herein may be performed by specialized circuitry, hardware, or combination thereof of the communication circuitry 116, which may be embodied as a system-on-a-chip (SoC) or otherwise form a portion of a SoC of the endpoint computing device 102 (e.g., incorporated on a single integrated circuit chip along with the application processor(s) 106, the baseband processor 108, the splitter logic unit 150, the memory 110, and/or other components of the endpoint computing device 102). Alternatively, in some embodiments, the specialized circuitry, hardware, or combination thereof may be embodied as one or more discrete processing units of the endpoint computing device 102, each of which may be capable of performing one or more of the functions described herein.

The illustrative communication circuitry 116 includes a network interface controller (NIC) 118, which may also be referred to as a host fabric interface (HFI) in some environments. The NIC 118 may be embodied as one or more add-in-boards, daughtercards, network interface cards, controller chips, chipsets, or other devices that may be used by the endpoint computing device 102 to connect with another compute device (e.g., the network computing device 124). In some embodiments, the NIC 118 may be embodied as part of a system-on-a-chip (SoC) that includes one or more processors, or included on a multichip package that also contains one or more processors. In some embodiments, the NIC 118 may include a local processor (not shown) and/or a local memory (not shown) that are both local to the NIC 118.

The one or more peripheral devices 120 may include any type of device that is usable to input information into the endpoint computing device 102 and/or receive information from the endpoint computing device 102. The peripheral devices 120 may be embodied as any auxiliary device usable to input information into the endpoint computing device 102, such as a keyboard, a mouse, a microphone, a barcode reader, an image scanner, etc., or output information from the endpoint computing device 102, such as a display, a speaker, graphics circuitry, a printer, a projector, etc. It should be appreciated that, in some embodiments, one or more of the peripheral devices 120 may function as both an input device and an output device (e.g., a touchscreen display, a digitizer on top of a display screen, etc.). It should be further appreciated that the types of peripheral devices 120 connected to the endpoint computing device 102 may depend on, for example, the type and/or intended use of the endpoint computing device 102. Additionally or alternatively, in some embodiments, the peripheral devices 120 may include one or more ports, such as a USB port, for example, for connecting external peripheral devices to the endpoint computing device 102.

The network computing device 124 may be embodied as any type of computation or computer device capable of performing the functions described herein, including, without limitation, a computer, a modem, a server (e.g., stand-alone, rack-mounted, blade, etc.), a switch, an IoT gateway, a gateway appliance, a sled (e.g., a compute sled, an accelerator sled, a storage sled, a memory sled, etc.), an enhanced network interface controller NIC (e.g., a host fabric interface (HFI)), a network appliance (e.g., physical or virtual), a router, a switch (e.g., a disaggregated switch, a rack-mounted switch, a standalone switch, a fully managed switch, a partially managed switch, a full-duplex switch, and/or a half-duplex communication mode enabled switch), a web appliance, a distributed computing system, a processor-based system, and/or a multiprocessor system.

Similar to the illustrative endpoint computing device 102, the illustrative network computing device 124 includes a compute engine 104 that may include one or more processors 128, a splitter logic unit 152 (similar to the splitter logic unit 150), a memory 130, an I/O subsystem 132, one or more data storage devices 134, communication circuitry 136 with a NIC 138, and, in some embodiments, one or more peripheral devices 140. Accordingly, it should be appreciated that the network computing device 124 includes similar and/or like components to that of the illustrative endpoint computing device 102 described above. As such, the descriptions of the like components are not repeated herein for clarity of the description with the understanding that the description of the corresponding components provided above in regard to the endpoint computing device 102 applies equally to the corresponding components of the network computing device 124. Of course, it should be appreciated that the network computing device 124 may include additional and/or alternative components, depending on the embodiment. Additionally, in some embodiments, the network computing device 124 may be configured to support similar functionality as described herein as being performed by the endpoint computing device 102 for managing out-of-order network packets using multi-processor architectures. Accordingly, it should be appreciated that, in such embodiments, the processor(s) 128 of the network computing device 124 may be embodied as one or more application processors and/or one or more baseband processor, as illustratively shown in the endpoint computing device 102 and described herein, to support functionality similar to that described herein as being performed by the endpoint computing device 102. Further, and as stated above, the splitter logic unit 152 may perform operations similar to those described above with reference to the splitter logic unit 150 of the endpoint computing device 102.

The network 122 may be embodied as any type of wireless communication network, including but not limited to a wireless local area network (WLAN), a wireless personal area network (WPAN), a cellular network (e.g., Global System for Mobile Communications (GSM), 3G, Long-Term Evolution (LTE), 5G, etc.), an edge network (e.g., the European Telecommunications Standards Institute's (ETSI's) Multi-Access Edge Computing (MEC) network), a wide area network (WAN), a global network (e.g., the Internet), or any hybrid or combination thereof. It should be appreciated that, in such embodiments, the network 122 may serve as a centralized network and, in some embodiments, may be communicatively coupled to another network (e.g., the Internet). Accordingly, the network 122 may include a variety of other virtual and/or physical network computing devices (e.g., routers, switches, network hubs, servers, storage devices, compute devices, etc.), as needed to facilitate communication between the network computing device 124 and the endpoint computing device 102, which are not shown to preserve clarity of the description. As stated above, the network 122 may have multiple radio links 160, 162 available to enable communication between the endpoint computing device 102 and the network computing device 124 and the radio links 160, 162 may be based on different communication technologies (e.g., the radio link 160 may be based on LTE communication technologies while the radio link 162 may be based on 5G communication technologies, etc.). In other embodiments, one or more of the radio links 160, 162 may implement Bluetooth technology, a wireless local area network (WLAN), a low power wide area network (LPWAN), Zigbee and other mesh protocols, radio frequency identification (RFID), and/or other wireless or wired communication technologies. For reordering of packet data using application processor 106, radio link aggregation may be integrated in 3GPP, similar to LTE WLAN link aggregation defined by 3GPP, and the PDCP layer may be used on top of all radio links.

Figure 2:
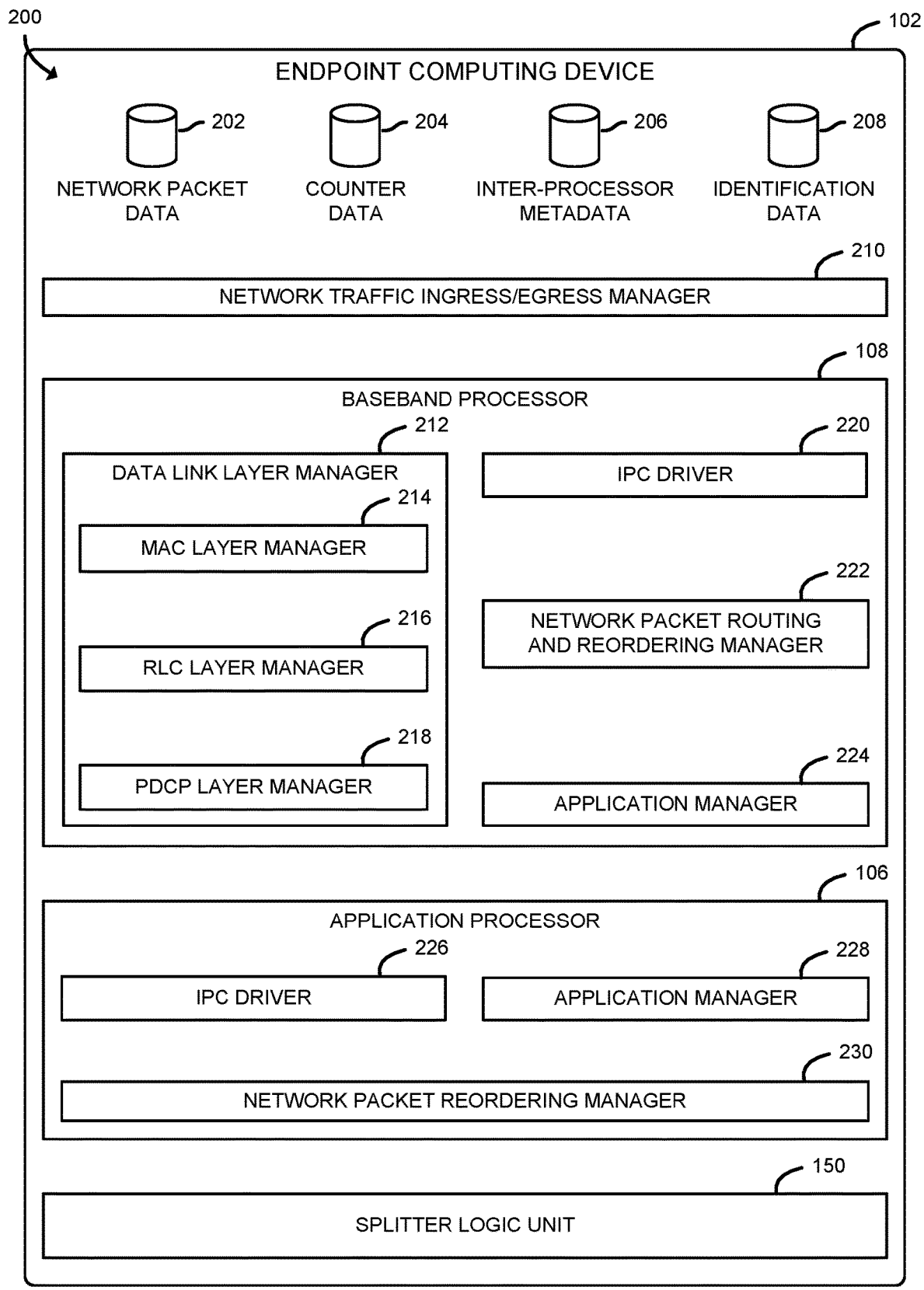
FIG. 2 is a simplified block diagram of at least one embodiment of an environment of the endpoint computing device of the system of FIG. 1 which includes a baseband processor, an application processor, and a splitter logic unit.

Referring now to FIG. 2, in use, the endpoint computing device 102 establishes an environment 200 during operation. The illustrative environment 200 includes a network traffic ingress/egress manager 210 (e.g., of the NIC 118), as well as the baseband processor 108, an illustrative one of the application processors 106, and the splitter logic unit 150 described relative to FIG. 1. The illustrative baseband processor 108 includes a data link layer manager 212, an inter-process communication (IPC) driver 220, a network packet routing and reordering manager 222, and an application manager 224. The illustrative application processor 106 includes an IPC driver 226, an application manager 228, and a network packet reordering manager 230. The various components of the environment 200 may be embodied as hardware, firmware, software, or a combination thereof. As such, in some embodiments, one or more of the components of the environment 200 may be embodied as circuitry or collection of electrical devices.

Additionally, in some embodiments, one or more of the illustrative components may form a portion of another component and/or one or more of the illustrative components may be independent of one another. Further, in some embodiments, one or more of the components of the environment 200 may be embodied as virtualized hardware components or emulated architecture, which may be established and maintained by other components of the endpoint computing device 102. It should be appreciated that the endpoint computing device 102 may include other components, sub-components, modules, sub-modules, logic, sub-logic, and/or devices commonly found in a computing device, which are not illustrated in FIG. 2 for clarity of the description. It should be further appreciated that while the baseband processor 108 and application processor 106 are illustratively shown as being located in a single endpoint device 102, the baseband processor 108 and/or application processor 106 may alternatively reside in another computing device (e.g., in a distributed network, in the network computing device 124, etc.) in which IPC is supported thereby or therebetween, depending on the embodiment.

In the illustrative environment 200, the endpoint computing device 102 additionally includes network packet data 202, counter data 204, inter-processor metadata 206, and identification data 208, each of which may be accessed by the various components and/or sub-components of the endpoint computing device 102. Further, each of the network packet data 202, the counter data 204, the inter-processor metadata 206, and the identification data 208 may be accessed by the various components of the endpoint computing device 102. Additionally, it should be appreciated that, in some embodiments, the data stored in or otherwise represented by each of the network packet data 202, the counter data 204, the inter-processor metadata 206, and the identification data 208 may not be mutually exclusive relative to each other.

For example, in some implementations, data stored in the network packet data 202 may also be stored as a portion of one or more of the counter data 204, the inter-processor metadata 206, and the identification data 208. As such, although the various data utilized by the endpoint computing device 102 is described herein as particular discrete data, such data may be combined, aggregated, and/or otherwise form portions of a single or multiple data sets, including duplicative copies, in other embodiments. Additionally, while the network packet data 202, the counter data 204, the inter-processor metadata 206, and the identification data 208 are illustratively shown as being stored external to the baseband processor 108 and the application processor 106, it should be appreciated that at least a portion of the data contained therein may be stored on local to the baseband processor 108 or the application processor 106.

The network traffic ingress/egress manager 210, which may be embodied as hardware, firmware, software, virtualized hardware, emulated architecture, and/or a combination thereof as discussed above, is configured to manage receive inbound and route/transmit outbound network traffic at the physical layer. To do so, the illustrative network traffic ingress/egress manager 210 is configured to facilitate inbound network communications (e.g., network traffic, network packets, network flows, etc.) to the endpoint computing device 102. Accordingly, the network traffic ingress/egress manager 210 is configured to manage (e.g., create, modify, delete, etc.) connections to physical and virtual network ports (i.e., virtual network interfaces) of the endpoint computing device 102 (e.g., via the communication circuitry 116, or more particularly the NIC 118), as well as the ingress buffers/queues associated therewith.

Additionally, the network traffic ingress/egress manager 210 is configured to facilitate outbound network communications (e.g., network traffic, network packet streams, network flows, etc.) from the endpoint computing device 102. To do so, the network traffic ingress/egress manager 210 is configured to manage (e.g., create, modify, delete, etc.) connections to physical and virtual network ports/interfaces of the endpoint computing device 102 (e.g., via the communication circuitry 116), as well as the egress buffers/queues associated therewith. In other words, the network traffic ingress/egress manager 210 is configured to manage the processing of network packets at the physical layer. In an illustrative embodiment in which the physical layer is a cellular physical layer, the network traffic ingress/egress manager 210 is configured to deliver the received transport blocks (i.e., via transport channels) to the baseband processor 108.

The data link layer manager 212, which may be embodied as hardware, firmware, software, virtualized hardware, emulated architecture, and/or a combination thereof as discussed above, is configured to manage the network packet processing operations associated with the data link layer of the protocol stack. To do so, the illustrative data link layer manager 212 includes a medium access control (MAC) layer manager 214 configured to manage the network packet processing operations associated with the MAC layer of the protocol stack, a radio link control (RLC) layer manager 216 configured to manage the network packet processing operations associated with the RLC layer of the protocol stack, and a packet data convergence control (PDCP) layer manager 218 configured to manage the network processing operations associated with the PDCP layer of the protocol stack. It should be appreciated that alternative wireless technologies may include additional and/or alternative components of the data link layer manager 212.

The IPC driver 220, which may be embodied as hardware, firmware, software, virtualized hardware, emulated architecture, and/or a combination thereof as discussed above, is configured to manage the inter-processor communications (i.e., via an IPC interface) between the baseband processor 108 and the application processor 106 (e.g., via the IPC driver 226 of the application processor 106). For example, depending on the embodiment, the IPC interface of the baseband processor 108 may be embodied as a Peripheral Component Interconnect Express (PCIe) interface, an Ethernet interface, a universal serial bus (USB) interface, or any other type of IPC interface capable of performing the operations described herein.

The network packet routing and reordering manager 222 is configured to manage the routing and reordering of network packets received by the endpoint computing device 102. To do so, the network packet routing and reordering manager 222 is configured to determine the target application associated with the received network packet. For example, the network packet routing and reordering manager 222 may be configured to perform a packet inspection and a routing filter. Additionally, the network packet routing and reordering manager 222 is configured to send the received network packet to an IP stack of the baseband processor 108 (e.g., via the manager 224 describe above) or to an IP stack of the application processor 106 (e.g., via the manager 228 described below).

The network packet routing and reordering manager 222 is further configured to detect out-of-order network packets and perform reordering operations thereon to deliver the received network packets to the application processor 106 in sequence. Depending on the embodiment, the network packet routing and reordering manager 222 may be configured to perform the reordering operations for certain flows (e.g., only to those flow types intended to be delivered to the IP stack on the baseband processor 108). In other embodiments, the network packet routing and reordering manager 222 may be configured to perform the reordering operations based on data link layer protocol headers (e.g., PDCP headers), transport layer protocol headers (e.g., TCP, UDP, etc.), network layer protocol headers (e.g., IPv4, IPv6, etc.), or a combination thereof. It should be appreciated that, under certain conditions (e.g., insufficient resources) the reordering operations performed by the network packet routing and reordering manager 222 may be disabled (e.g., during a flow control sequence). In some embodiments, the network packet routing and reordering manager 222 may form a portion of the PDCP layer managed by the PDCP layer manager 218, rather than a stand-alone component as illustratively shown.

To enable reordering operations by the network packet reordering manager 230 of the application processor 106, the network packet routing and reordering manager 222 is configured to provide an event notification to the application processor 106, in the event that a triggering event is detected. Such triggering events may include the creation of a new PDCP entity for the application processor 106 to start monitoring and reordering packets for this PDCP entity, the release of an ongoing PDCP entity for the application processor 106 to deliver all pending data to the application associated to this PDCP entity, or the detection of a non-recoverable PDCP count gap (e.g., as described herein) to prevent the application processor from waiting for network packets that will never be delivered.

To notify a non-recoverable PDCP count gap, the network packet routing and reordering manager 222 may be configured to transmit a dedicated event to the application processor 106 as soon as a non-recoverable PDCP count gap is detected and the end of the gap is known. Under such conditions, the PDCP count of the lower edge of the PDCP receiving window on the baseband processor 108 may be provided, or the network packet routing and reordering manager 222 can also provide, to the application processor 106, the PDCP count of the network packets that have been dropped. Alternatively, the network packet routing and reordering manager 222 may be configured to perform an in-band signaling notification by setting a flag in a network packet sent to the application processor 106 that indicates that the packet is in sequence according to the data link layer PDCP count, such that the application processor 106 (e.g., via the network packet reordering manager 230) can then determine that no network packet with an older PDCP count will be received.

In an illustrative example of signaling between the application processor 106 and the baseband processor 108, the signaling can be performed in-band (i.e. a protocol layer is introduced in front of the network packet to send to the application processor 106 in order to convey the data link layer information to the application processor such that the application processor 106 side of the protocol layer can interpret such data and provide it to the network packet reordering manager 230 of the application processor 106. In another illustrative example, the data link layer information may be added to a transfer descriptor used by the IPC drivers 220, 226 to exchange data between the application processor 106 and the baseband processor 108 as described herein. In furtherance of the illustrative example of the data link layer information being added to the transfer descriptor, the data link layer information may include control information (e.g., in the form of a message identifier) that indicates a purpose of the data link layer information, such as, but not limited to a PDCP entity release, a PDCP entity has been created, PDCP notification with the last received packet with PDCP SN in sequence (i.e., corresponding to the lower bound of PDCP receiving window), a flow control start request, a flow control release request, a deciphering failure, a deciphering success, a deciphering validation result request, or a deciphering validation result indication.

The application manager 224, which may be embodied as hardware, firmware, software, virtualized hardware, emulated architecture, and/or a combination thereof as discussed above, is configured to manage the interface(s) to the respective application(s) being executed by the baseband processor 108. For example, the application manager 224 is configured to receive at least a portion of the data associated with a received network packet from the network packet routing and reordering manager 222 (e.g., via the IP stack).

The IPC driver 226, which may be embodied as hardware, firmware, software, virtualized hardware, emulated architecture, and/or a combination thereof as discussed above, is configured to manage the inter-processor communications (i.e., via an IPC interface) between the application processor 106 and the baseband processor 108 (e.g., via the IPC driver 220 of the baseband processor 108). Similar to the IPC driver 220 of the baseband processor 108, depending on the embodiment, the IPC interface of the application processor 106 may be embodied as a PCIe interface, an Ethernet interface, a USB interface, or any other type of IPC interface capable of performing the operations described herein.

The application manager 228, which may be embodied as hardware, firmware, software, virtualized hardware, emulated architecture, and/or a combination thereof as discussed above, is configured to manage the interface(s) to the respective application(s) being executed by the application processor 106. For example, the application manager 228 is configured to receive at least a portion of the data associated with a received network packet from the network packet routing and reordering manager 222 (e.g., via the IP stack).

The network packet reordering manager 230, which may be embodied as hardware, firmware, software, virtualized hardware, emulated architecture, and/or a combination thereof as discussed above, is configured to detect out-of-order network packets and perform data reordering operations thereon to deliver the network packets in sequence to either the IP stack of the application processor 106 or an application executing on the application processor 106. Similar to the reordering operation performed by the network packet routing and reordering manager 222, the network packet reordering manager 230 may be configured to perform the reordering operations based on data link layer protocol headers (e.g., PDCP headers), transport layer protocol headers (e.g., TCP, UDP, etc.), network layer protocol headers (e.g., IPv4, IPv6, etc.), or a combination thereof.

In the illustrative embodiment, the network packet reordering manager 230 is configured to use additional data link layer information received from the baseband processor 108 to perform packet reordering operations. The additional data link layer information may include a unique data link layer sequence number, a unique PDCP entity identifier, and a Subscriber Identity Module (SIM) indicator, if supported. For example, the unique data link layer sequence number may be the PDCP COUNT defined by 3GPP. It should be appreciated that the PDCP COUNT is the concatenation of the Hyper Frame Number (HFN) and the PDCP SN, and that the PDCP COUNT is unique per PDCP entity. The unique PDCP entity identifier may be any type of identifier usable to distinguish between flows received from different radio bearers wherein there is one PDCP entity per radio bearer. As such, the PDCP entity identifier can be a unique self-constructed identifier, the data radio bearer (DRB) identity, or the combination of the DRB identity and a radio access stratum technology (RAT) to ensure a uniqueness of the identifier, even in the case of an inter-radio access technology (inter-RAT) handover scenario. It should be appreciated that the SIM indicator is usable to differentiate flows for multiple SIMs.

The network packet reordering manager 230 is configured to detect an out-of-order network packet (i.e., a gap in the PDCP count). Upon detection of the out-of-order network packet, the network packet reordering manager 230 is configured to deliver the out of sequence packets belonging to applications/protocols that are tolerant to out-of-order reception due to, for example, their natural support multi-path reception. Alternatively, the network packet reordering manager 230 may buffer and deliver in sequence packets belonging to applications/protocols after identification of a service data flow (SDF) (e.g. based on IP 5-tuple of source/destination IP addresses, source/destination ports, and transport layer protocol) and sorting based on sequence number extracted from transport/network protocol headers of the packet (e.g. TCP sequence numbers, RTP sequence numbers, etc.) and data link information to identify the SIM and PDCP entity. As such, the delivery of in sequence network packets to their respective consumer (i.e., IP stack or application) for each respective SDF can be done faster compared to data link layer (i.e., PDCP count) reordering only. Additionally, the network packet reordering manager 230 may alternatively buffer and deliver in sequence network packets after reordering them using data link layer PDCP header information for network packets which do not belong to either of the aforementioned categories described above.

It should be appreciated that as network packets are received out of sequence from the baseband processor 108, PDCP count gaps may be observed frequently. Accordingly, under conditions in which the network packets are reordered based on data link layer information, the network packet reordering manager 230 is configured to the out-of-order network packet as long as the gap is present, or until notification has been received from the baseband processor 108 that the gap cannot be recovered. When a packet with an in—sequence PDCP count is received, the network packet reordering manager 230 is configured to deliver all of the in sequence network packets to the upper layer. Accordingly, the network packet reordering manager 230 can shift the corresponding data link layer reception window.

However, if a non-recoverable PDCP count gap is detected, the network packet reordering manager 230 may be configured to employ a timer based solution in which the network packet reordering manager 230 starts a timer and, at expiration of the time, the network packet reordering manager 230 is configured to consider all missing packet as lost and shift the data link layer reception window accordingly. Alternatively, the network packet reordering manager 230 may be configured to rely on an indication from the baseband processor 108 to detect the PDCP count gap and move data link layer reception window accordingly.

It should be appreciated that the PDCP count gap may occur due to a number of reasons, such as, but not limited to, a discard function at the PDCP transmitter side, misbehavior of Evolved Node B (eNB) functionality, discarded PDCP PDU due to shortage of memory resources, discarded PDCP PDU due to wrongly deciphered packets, due to wrong HFN prediction at the receiver side, discarded PDCP PDU after applying path-through filters configured in the baseband processor 108 by the application processor 106, connection sharing between the application processor 106 and the baseband processor 108 applications (e.g., some network packets delivered by PDCP are then routed to a baseband processor 108 application leading to a gap in PDCP count observed by the application processor 106), or the expiration of a reordering timer at the PDCP level on the receiver side, wherein there are still gaps in the PDCP reception window in the baseband processor 108.

Additionally, the environment 200 includes the splitter logic unit 150, which, as described above, is configured to identify a service data flow associated with a set of packets to be sent to a recipient computing device, determine a target quality of service for the service data flow, determine, as a function of the target quality of service, one or more radio links on which to send the packets, and coordinate with other components of the endpoint computing device (e.g., the baseband processor 108) to send the packets through the determined one or more radio links (e.g., the radio links 160, 162). The network computing device 124 may establish an environment similar to the environment 200.

Figure 3:
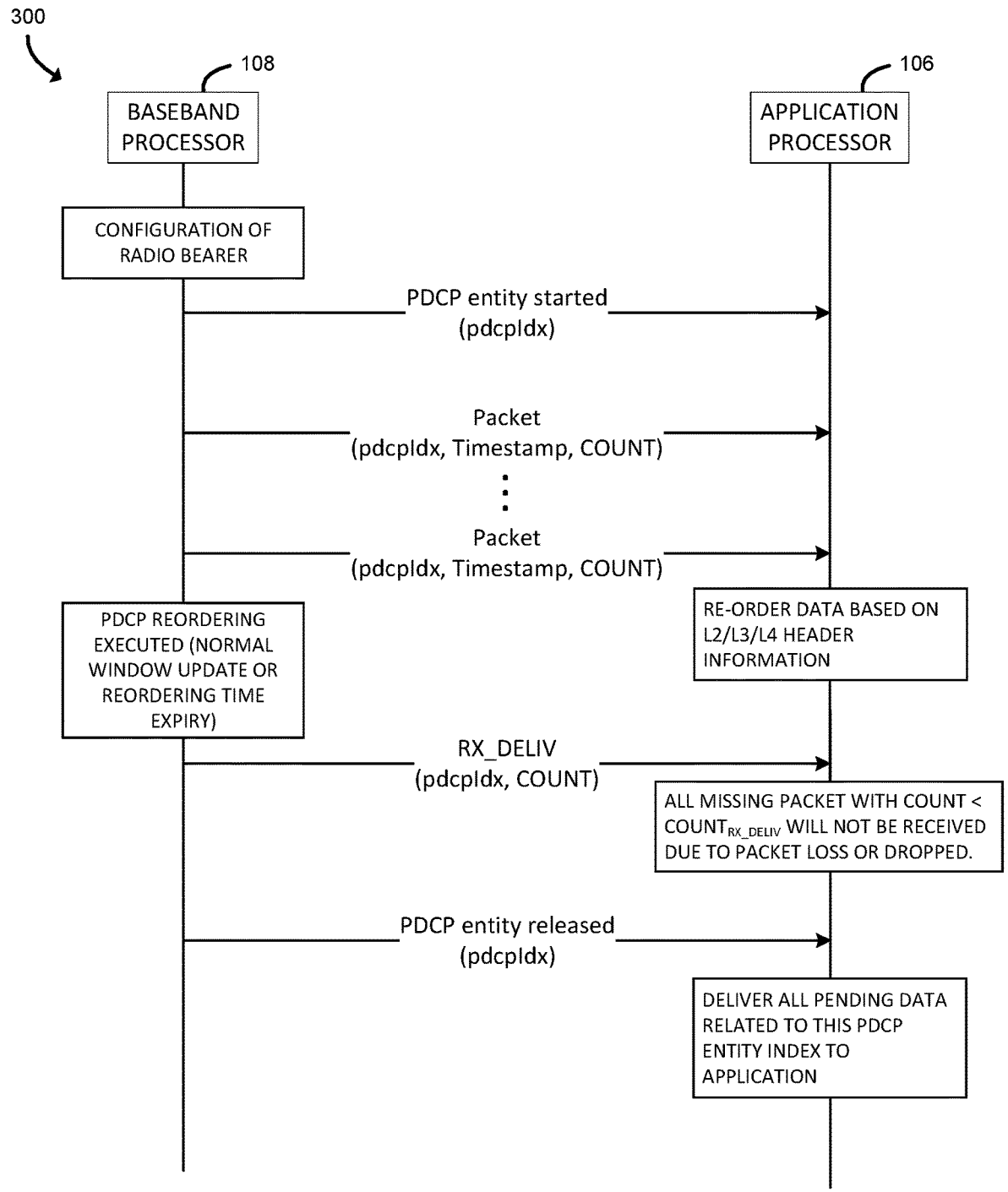
FIG. 3 is a simplified flow diagram of at least one embodiment of a communication flow for illustrating a dynamic interaction between the baseband processor and the application processor of FIGS. 1 and 2 for data reordering on the application processor.
Figure 4:
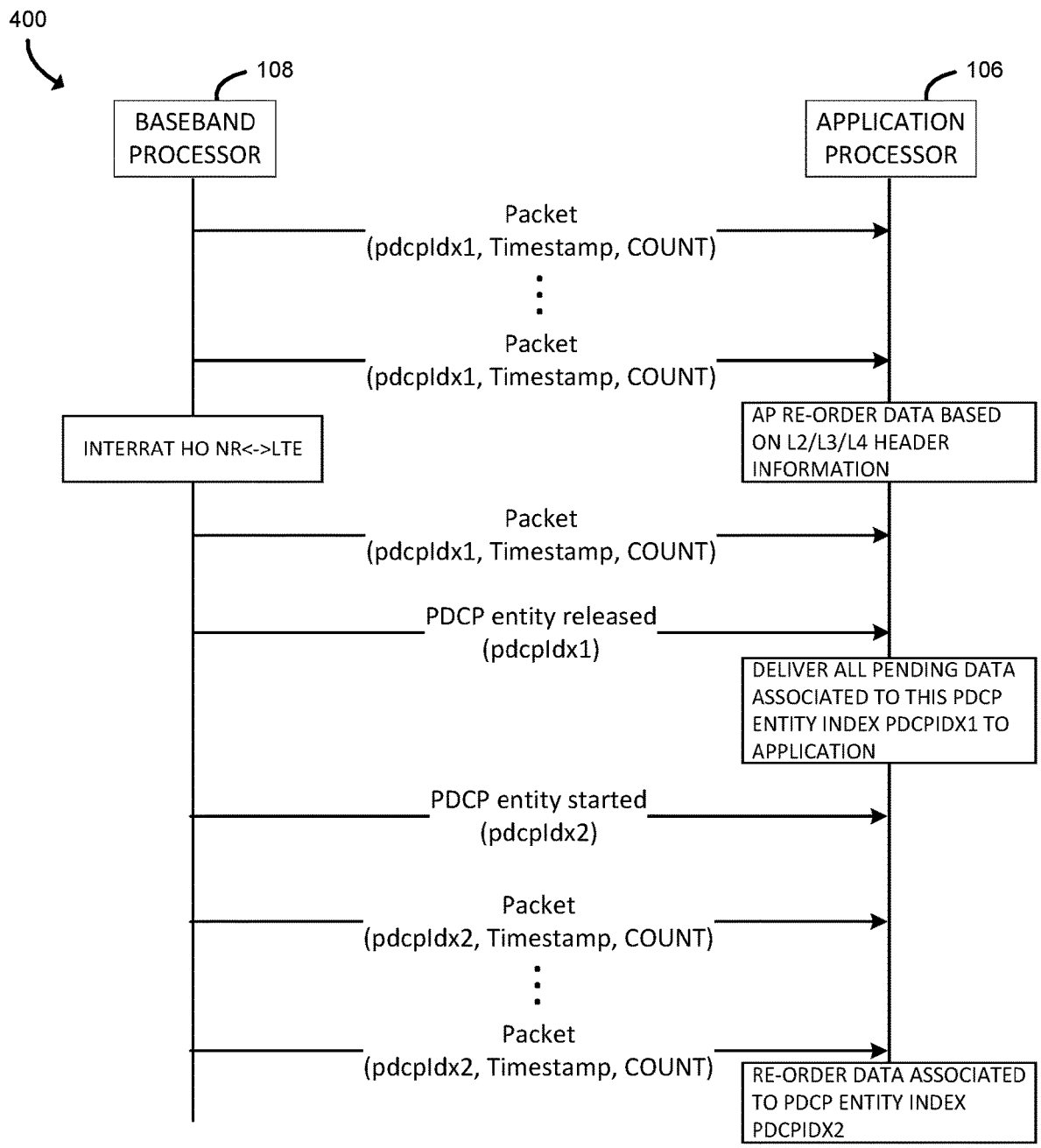
FIG. 4 is a simplified flow diagram of at least one embodiment of a communication flow for illustrating a dynamic interaction between the baseband processor and the application processor of FIGS. 1 and 2 in the event of an inter-radio access technology (inter-RAT) handover.
Figure 5:
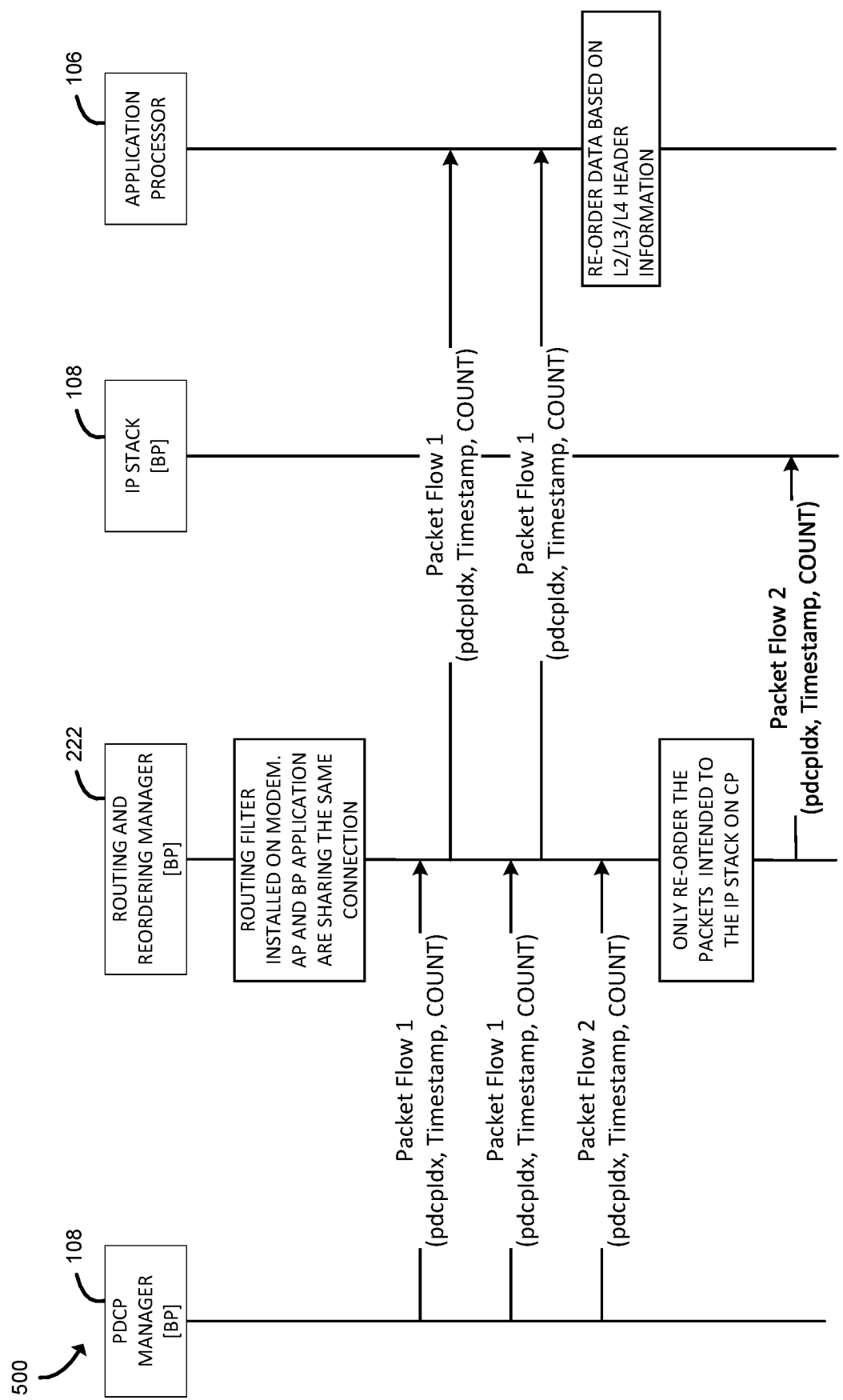
FIG. 5 is a simplified flow diagram of at least one embodiment of a communication flow for illustrating a dynamic interaction between the baseband processor and the application processor of FIGS. 1 and 2 in the event of connection sharing between the baseband processor and the application processor.

Referring now to FIG. 3, an embodiment of a communication flow 300 for illustrating a dynamic interaction between the baseband processor 108 and the application processor 106 is shown. Referring to FIG. 4, an embodiment of a communication flow 400 for illustrating a dynamic interaction between the baseband processor 108 and the application processor 106 in the event of an inter-RAT handover event is shown. Referring to FIG. 5, an embodiment of a communication flow 500 for illustrating a dynamic interaction between the baseband processor 108 and the application processor 106 in the event of connection sharing between the baseband processor 108 and the application processor 106 is shown. It should be appreciated that the application processor 106 can configure the modem to enable or disable the CP to perform out-of-order delivery of data to the application processor 106. It should be further appreciated that this may depend on the capability of the application processor 106 to perform data link layer/network layer/transport layer reordering on application processor 106.

The application processor 106 may also configure the baseband processor 108 to do only partial out of order delivery. For example, the application processor 106 can configure the baseband processor 108 to do out-of-order delivery for some specific radio bearer only, some specific LTE PDN connection, LTE EPS bearer, NR PDU session, NR QFI flow, perform reordering only for a specific packet bundle or time period, radio bearer with a specific PDN or PDU session type such as type IPv4, IPv6 or Ethernet, or radio bearer where header compression is not enabled. To do so, the application processor 106 can send a configuration message to the baseband processor 108 (e.g., to the network packet routing and reordering manager 222) that specifies how the reordering split between the application processor 106 and the baseband processor is to be performed. The baseband processor 108 may perform local sorting for packets received within a time period (e.g. one sub-frame or one transport block) where packets have higher probability to be received in order during this time period before delivery of these packets to the application processor 106. As such, this allows the saving of duplicate data link layer reordering effort on the application processor 106 side.

In the event a connection is used both by an application residing on the baseband processor 108 and an application residing on the application processor 106, then the baseband processor 108 (e.g., the network packet routing and reordering manager 222) can direct the network packet either to the IP stack of the baseband processor 108 or to the application processor 106 (e.g., based on one of more routing filters). The application processor 106 may configure the baseband processor 108 to deliver out of sequence data to the application processor 106 and the application processor 106 will do the reordering of such packets. However network packets sent to the IP stack of the baseband processor 108 may need to be reordered before delivery to the IP stack. Accordingly, the baseband processor 108, or more particularly the network packet routing and reordering manager 222 of the baseband processor 108, can then be configured to do partial reordering only for data intended for the application executing on the application processor 106.

Figure 6:
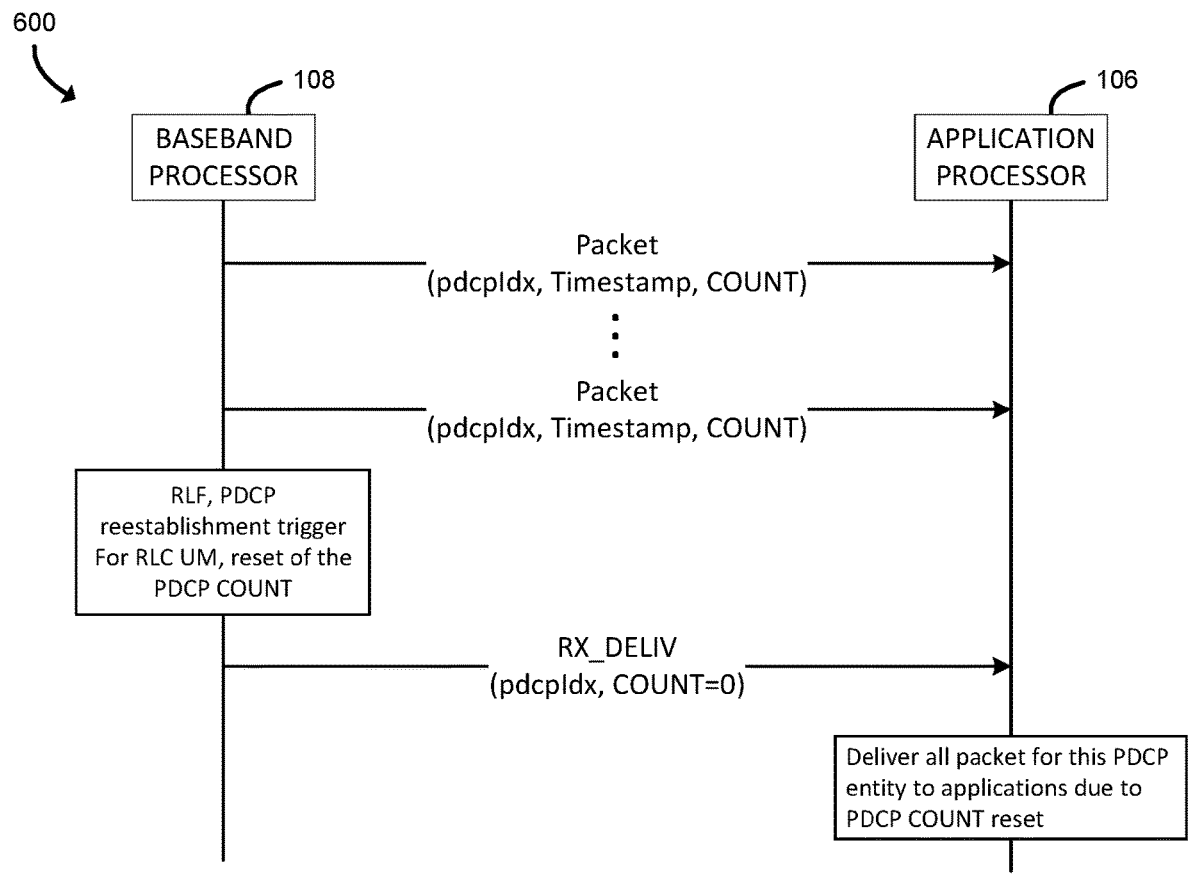
FIG. 6 is a simplified flow diagram of at least one embodiment of a communication flow for illustrating a dynamic interaction between the baseband processor and the application processor of FIGS. 1 and 2 in the event of a PDCP re-establishment with radio link control (RLC) unacknowledged mode (UM)
Figure 7:
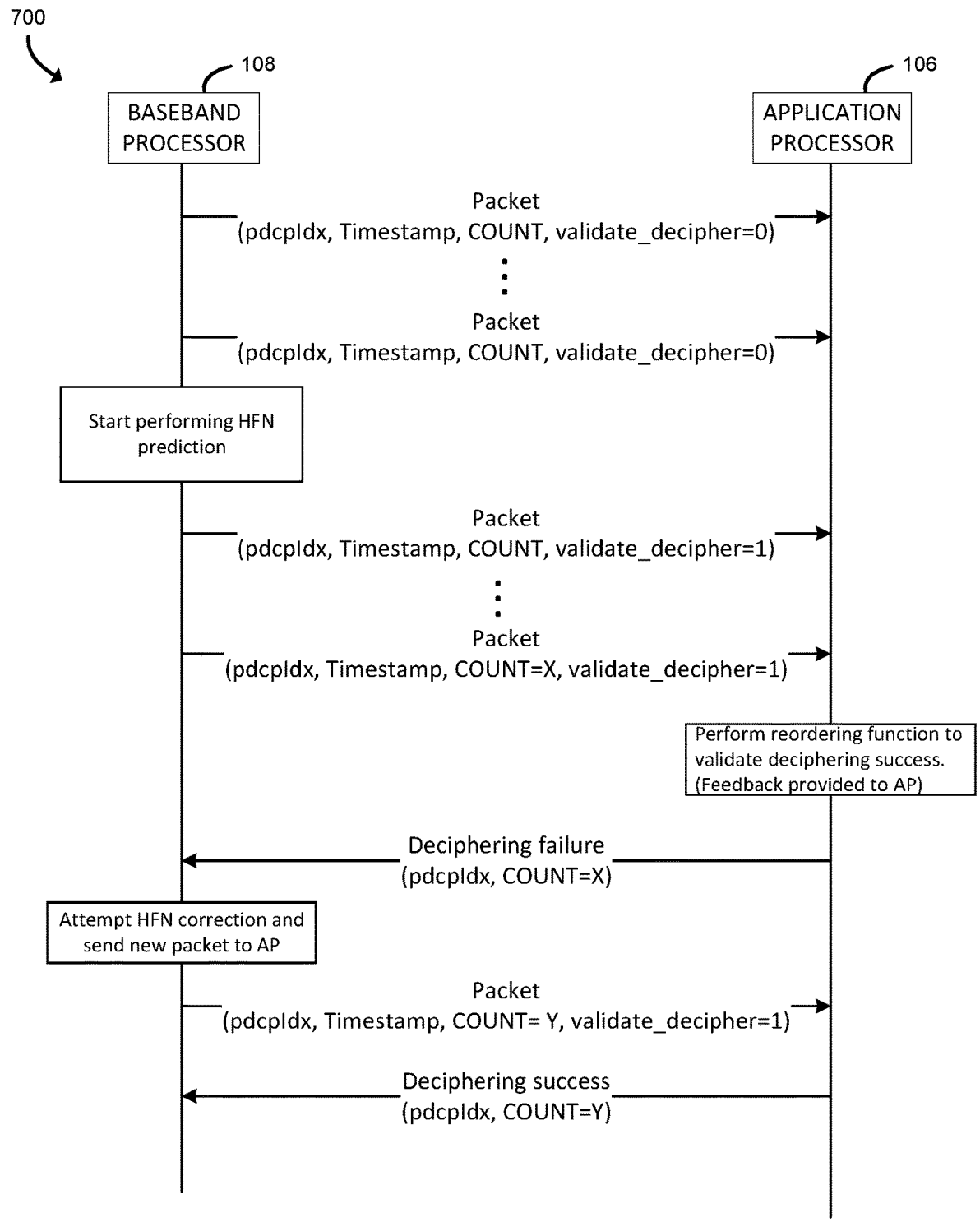
FIG. 7 is a simplified flow diagram of at least one embodiment of a communication flow for illustrating a dynamic interaction between the baseband processor and the application processor of FIGS. 1 and 2 in the event of a Hyper Frame Number (HFN) prediction by the baseband processor and deciphering validation by the application processor.

Referring now to FIG. 6, an embodiment of a communication flow 600 for illustrating a dynamic interaction between the baseband processor 108 and the application processor 106 in the event of a PDCP re-establishment with radio link control (RLC) unacknowledged mode (UM) is shown. Referring to FIG. 7, an embodiment of a communication flow 700 for illustrating a dynamic interaction between the baseband processor 108 and the application processor 106 in the event of an HFN prediction by the baseband processor 108 and deciphering validation by the application processor 106 is shown. The application processor 106 is configured to provide assistance for HFN recovery on cellular networks. The 3GPP NR standard has already introduced the capability for PDCP to deliver out of sequence packets to an upper layer.

Accordingly, it should be appreciated that, in an illustrative embodiment, the baseband processor 108 may be configured to follow the standard when delivering data to the application processor 106. However, for LTE, it is not foreseen in the 3GPP standard that PDCP deliver out of sequence. More particularly, in LTE, the reordering is mainly done in the RLC layer, except for the dual connectivity use case. Accordingly, the HFN should be predicted for each received PDCP packet, even if the RLC reordering is not yet performed (i.e., PDCP PDU are out of order from RLC perspective). For example, PDCP count[HFN, SN] may be an input to a deciphering algorithm. However, if the HFN prediction fails, then the network packet will not be deciphered properly. Accordingly, the baseband processor 108 can validate if the deciphering is correct by checking the resulting network layer/transport layer protocol header.

However, it should be appreciated that in the case of a non-IP packet, the baseband processor 108 cannot validate the network layer/transport layer protocol header. Under such conditions, the application processor 106 is configured to provide a new function to validate the correctness of deciphered received packets from the baseband processor 108. For this purpose, the baseband processor 108 can, for example, check that the fields of the network layer/transport layer protocol headers are meaningful. To do so, the application processor 106 is configured to provide a notification to the modem of the baseband processor 108, in case the application processor 106 detects a potential deciphering issue. The modem of the baseband processor 108 can then attempt to correct the HFN prediction and send newly deciphered data. Further, the application processor 106 can provide feedback to the baseband processor 108 if the deciphering is correct. Accordingly, the baseband processor 108 can use this information to detect incorrect HFN prediction. Additionally, the application processor 106 can drop any network packet received from the baseband processor 108 when a deciphering issue is detected.

It should be appreciated that the PDCP layer on the baseband processor 108 (e.g., the PDCP layer manager 218 of FIG. 2) knows when HFN prediction is performed. Accordingly, the PDCP layer is aware of when to set a flag when sending a network packet to the application processor 106 to request the application processor 106 to validate that the deciphering of this network packet is correct. In response, the application processor 106 may validate the received network packet and confirm to PDCP on the baseband processor 108 that the deciphering is successful. The baseband processor 108 may also indicate start and stop of the HFM prediction period and query the application processor 106 to obtain status on the deciphering result. The application processor 106 may provide statistics on packet bundle with HFN prediction and notify, for example, the number of failed and successful deciphered packets along with their corresponding PDCP count.

Under certain conditions, network packets may be transmitted to the application processor 106 out of order with robust header compression (RoHC) enabled. As per the 3GPP specification, PDCP data packets received on a radio bearer with RoHC enabled are to be provided to a decompression entity only when they are in order. Accordingly, in the event that out of order delivery is enabled by the application processor 106 for such a radio bearer, it should be appreciated that the application processor 106 is configured to perform data link layer reordering, header decompression, and validation of successful deciphering under such conditions.

Figure 8:
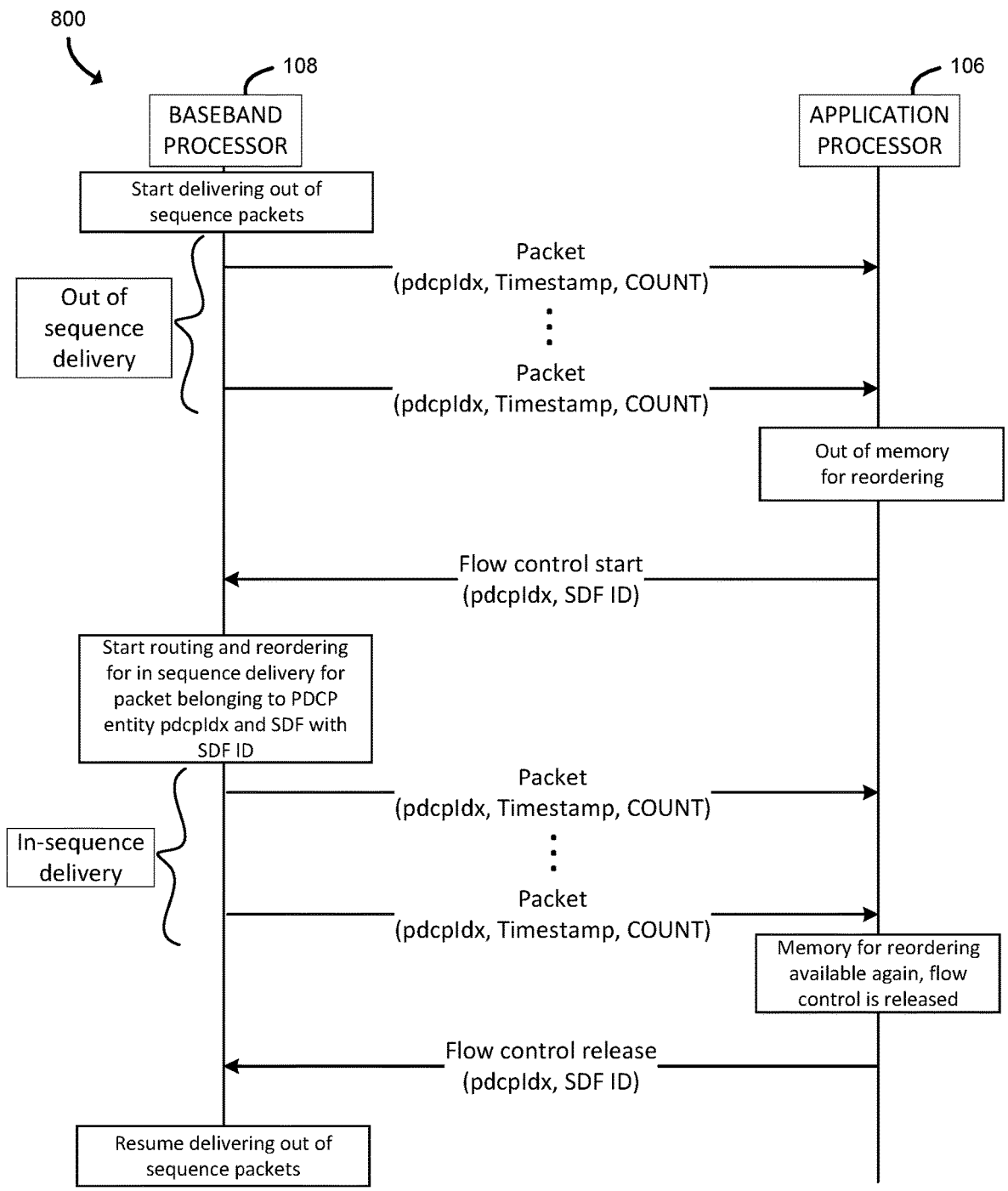
FIG. 8 is a simplified flow diagram of at least one embodiment of a communication flow for illustrating a dynamic interaction between the baseband processor and the application processor of FIGS. 1 and 2 in the event of reordering memory exhaustion on the application processor.

Referring now to FIG. 8, an embodiment of a communication flow 800 for illustrating a dynamic interaction between the baseband processor 108 and the application processor 106 in the event of reordering memory exhaustion on the application processor 106 is shown. It should be appreciate that with higher data link reception data rates, the data link layer reordering memory necessary to perform the required reordering operations increases, such that it may become difficult for the application processor 106 to guarantee availability of the necessary amount of memory to perform the required reordering operations. Accordingly, under conditions in which the application processor 106 has limited memory available for the data link layer reordering, a flow control mechanism can be used by the application processor 106 to notify the baseband processor 108 to stop sending data.

Additionally, the application processor 106 can also notify the baseband processor 108 to stop out of order delivery and to perform local reordering on the baseband processor 108 side until the application processor 106 reordering memory is available again. It should be appreciated that such a flow control mechanism can apply for all radio bearer/PDCP entities or some selected radio bearer/PDCP entity only. Additionally or alternatively, the flow control mechanism may also apply also to a specific service data flow. As such, this allows the baseband processor 108 to continue sending network packets to the application processor 106 belonging to higher priority SDFs while the network packets for lower priority flows are blocked.

Figure 9:
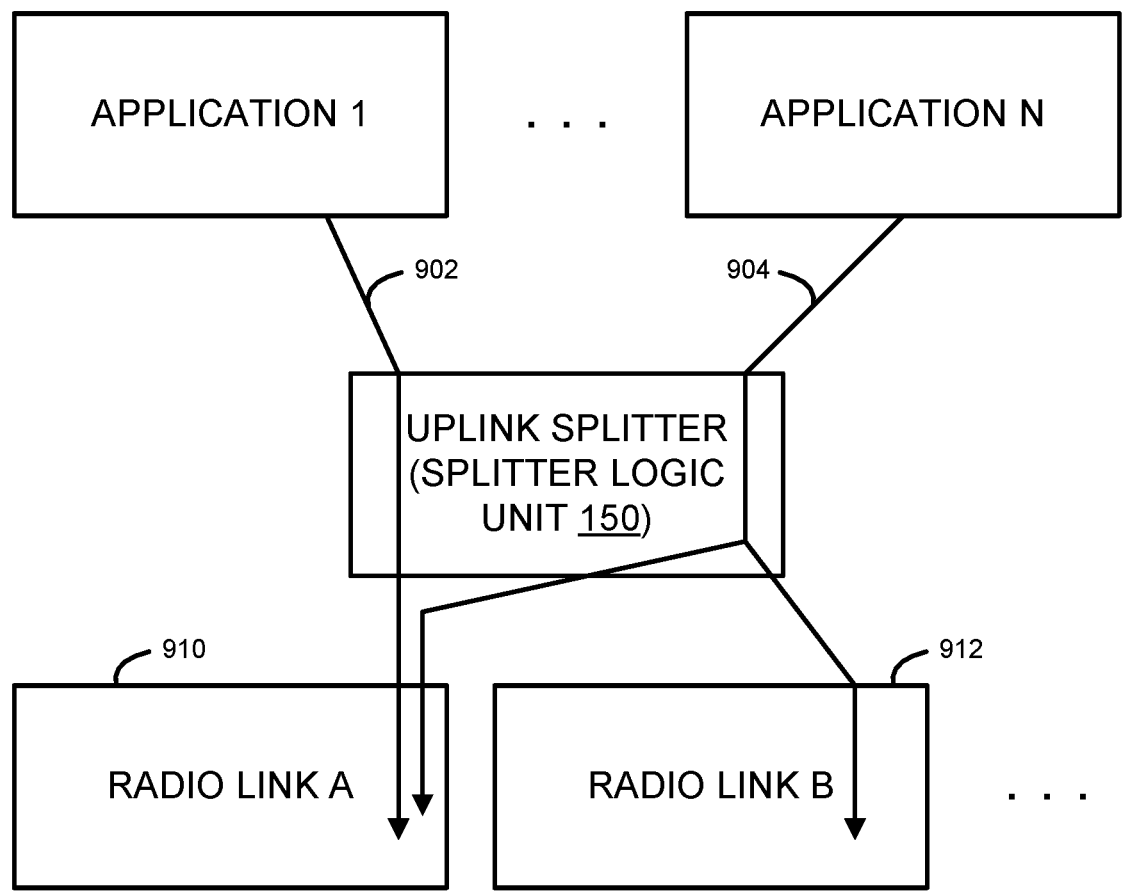
FIG. 9 is a simplified block diagram of at least one embodiment of selective splitting of service data flows among available radio links that may be performed by a computing device in the system of FIG. 1.
Figure 10:
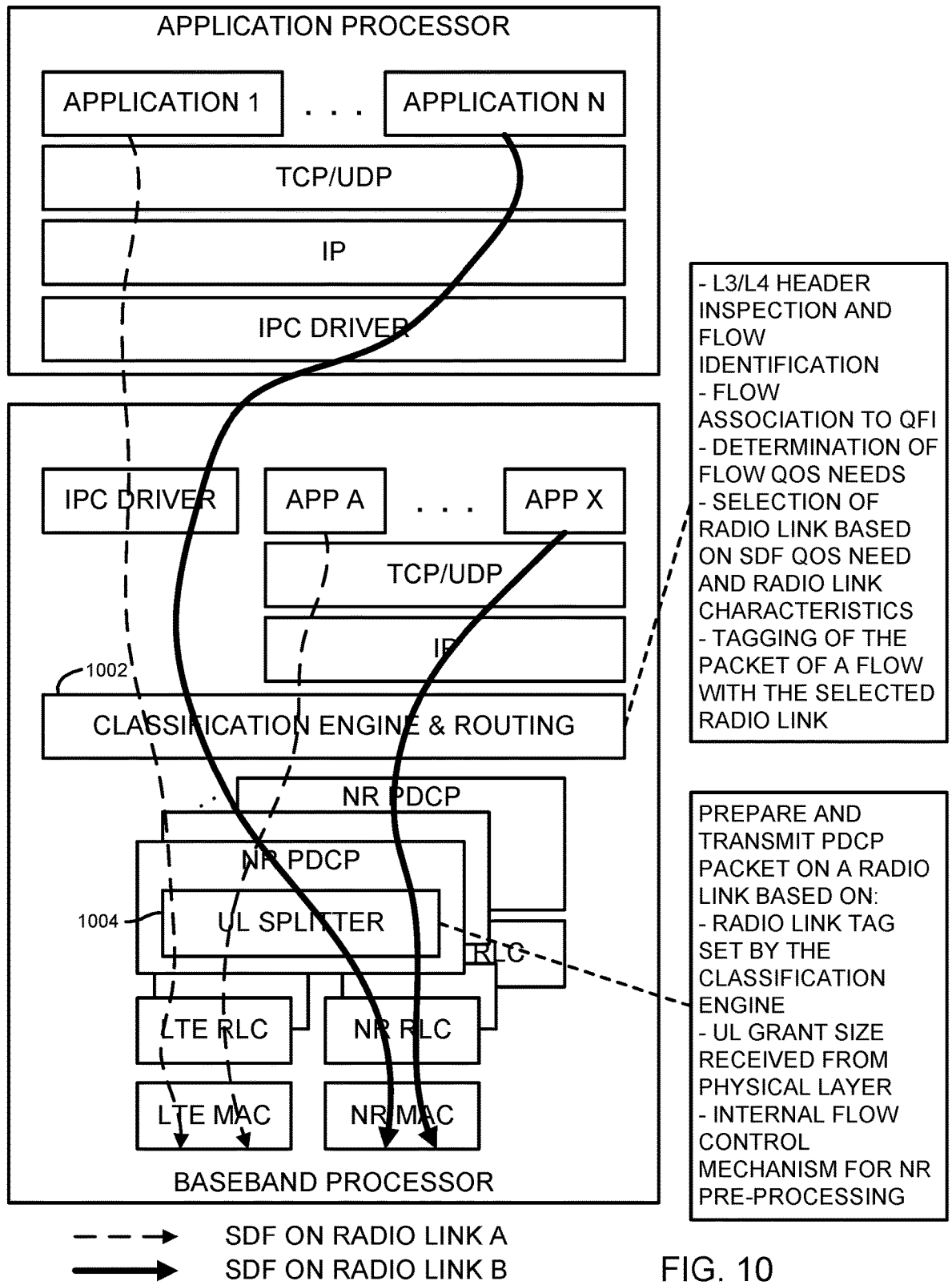
FIG. 10 is a simplified block diagram of at least one embodiment of service data flows among components of a computing device in the system of FIG. 1.

Referring now to FIG. 9, the computing devices (e.g., the endpoint computing device 102 and the network computing device 124) of the system 100 are capable of selectively splitting (e.g., enabling splitting or disabling splitting) of service data flows (SDFs) 902, 904 associated with applications. More specifically, based on the target quality of service (Qos) data (e.g., a target latency, a target jitter, etc.) for an SDF associated with an application and the capabilities of the available radio links 160, 162 (e.g., the theoretical capabilities, present capabilities given the present level of traffic over the radio links 160, 162, etc.) a computing device 102, 124 may determine to allow the SDF (e.g., the SDF 904) for an application to be split across multiple radio links 910, 912, similar to radio links 160, 162 of FIG. 1 (e.g., if the target QoS data indicates that the application is not sensitive to latency or jitter) or may require that an SDF (e.g., the SDF 902) only be sent through one radio link 910 (e.g., if the jitter associated with sending the SDF through multiple radio links 910, 912 would exceed a target amount of jitter defined in the target QoS data). Referring now to FIG. 10, a more detailed diagram is shown in which the operations of the splitter logic unit 150 are represented in two blocks, a classification engine and routing block 1002 and an uplink splitter block 1004. As described above, all or a portion of the splitter logic unit 150 may be incorporated in another component of a compute device and, as shown in FIG. 10, the blocks 1002, 1004 are incorporated into the baseband processor (similar to the baseband processor 108 of FIG. 1).

Figure 11:
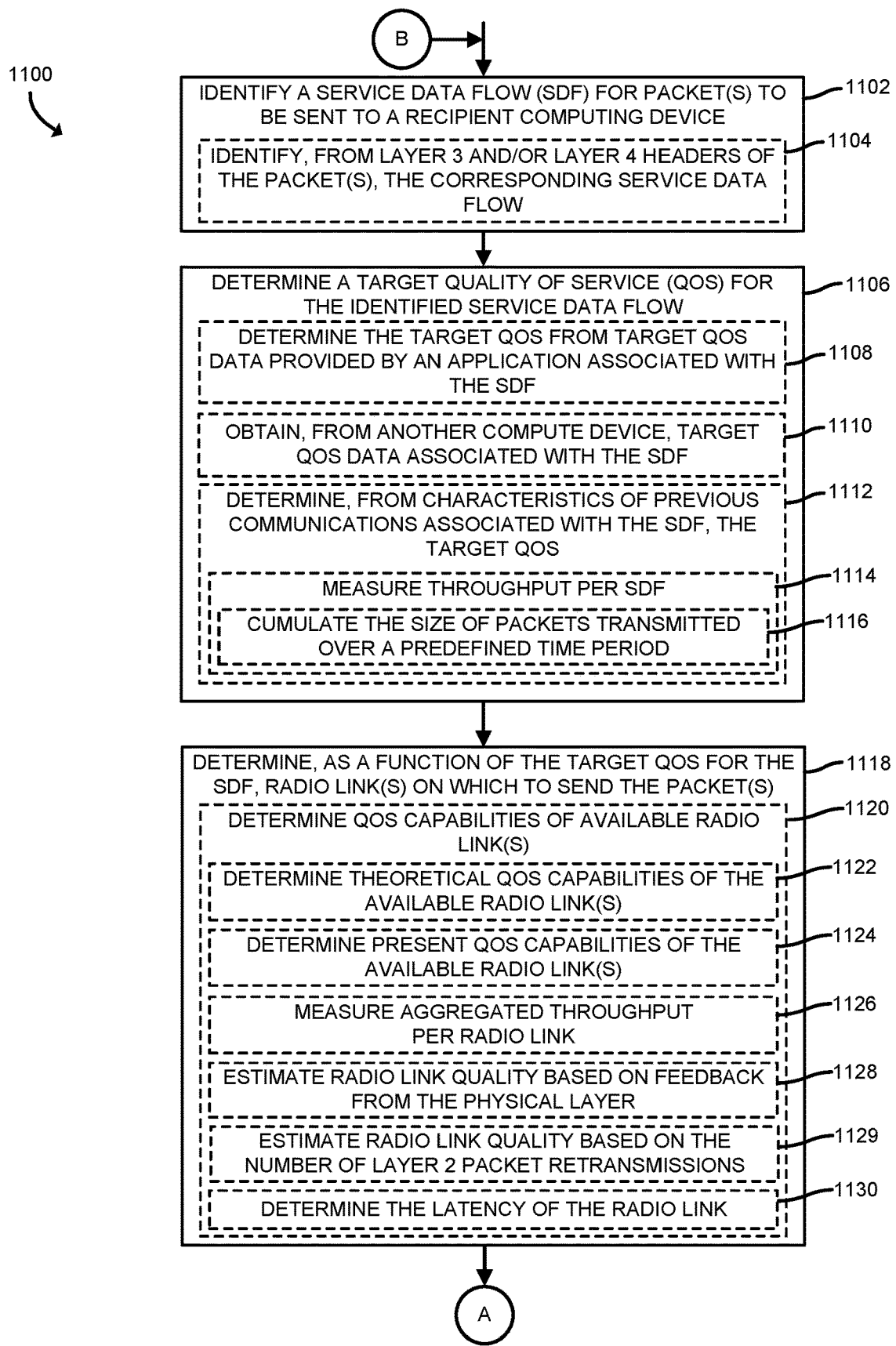
FIGS. 11 and 12 are simplified block diagrams of at least embodiment of a method for selectively splitting service data flows that may be performed by a computing device in the system of FIG. 1.

Referring to FIG. 11, in operation, a computing device 102, 124 of the system 100 may perform a method 1100 for selectively splitting service data flows among multiple radio links. The method 1100 is described below relative to the endpoint computing device 102 (e.g., when sending packets to the network computing device 124 as the recipient computing device). However, it should be understood that the network computing device 124 may also perform the method 1100 when sending packets (e.g., to the endpoint computing device 102). In the illustrative embodiment, the method 1100 begins with block 1102 in which the endpoint computing device 102 identifies a service data flow (SDF) for packets (e.g., packets of data produced by an application executed by the application processor 106) that are to be sent to a recipient computing device (e.g., the network computing device 124). In doing so, and as indicated in block 1104, the endpoint computing device 102 identifies, from layer 3 (e.g., network layer) and/or layer 4 (e.g., transport layer) headers of the packets, the corresponding SDF that the packets pertain to. Subsequently, in block 1106, the endpoint computing device 102 determines a target quality of service (QOS) for the identified service data flow. In doing so, and as indicated in block 1108, the endpoint computing device 102 may determine the target QOS from QOS data provided by an application associated with the service data flow. For example, the application may utilize an application programming interface (API) to provide, to the splitter logic unit 150, data indicative of a target latency (e.g., a latency that is not to be exceeded), a target jitter (e.g., a jitter that is not to be exceeded), a target throughput (e.g., a minimum acceptable throughput), and/or other factors that define the quality of service to be provided to the application. As an example, a real time gaming application may specify that the minimum acceptable latency is 50 milliseconds, while another type of application (e.g., a media streaming application) may specify a larger minimum acceptable latency. In some embodiments, and as indicated in block 1110, the endpoint computing device 102 may obtain data indicative of the target quality of service from another compute device, such as by sending an identifier of the application and/or an associated IP address and/or port, to a cloud computing device that maintains database of the corresponding target quality of service data, and receiving, from the cloud computing device, the target quality of service data. Alternatively, and as indicated in block 1112, the endpoint computing device 102 may determine, from characteristics of previous communications associated with the service data flow, the target quality of service. For example, the endpoint computing device 102 may measure the throughput for the service data flow over a previous time period, as indicated in block 1114. In doing so, the endpoint computing device 102 may cumulate the sizes of the packets transmitted in connection with the service data flow over the predefined time period (i.e., the previous time period), as indicated in block 1116. In some embodiments, the target quality service may be determined from a present access point name (APN), present quality flow indicator (QFI), traffic class (IPv6), ToS field (IPv4), packet size, and/or type of transport layer used. Additionally or alternatively, in some embodiments, the target quality of service may be determined from a quality of service configuration associated with a PDCP context request (2G/3G), PDN connection request (LTE) or PDU session establishment request (NR). An AT command defined by 3GPP enables the configuration of APN and quality of service. The target quality of service may also be determined from a protocol configuration option (PCO) set by the application or connection manager. In some embodiments, the networking stack on the endpoint computing device 102 may add a hash tag (e.g., a hash tag that is unique per service data flow) in a packet descriptor when providing the packet to the modem (e.g., the communication circuitry 116). A QOS tag may also be added to the packet descriptor.

As discussed above, the method 1100 may be performed by the network computing device 124 as well, and the operations performed to determine the target quality of service for a given SDF may differ based on which computing device 102, 124 is performing the method 1100, based on the availability of the corresponding data. For example, the endpoint computing device 102 may perform the operation of block 1108 (e.g., determining the target QOS from an API call from the application) while the network computing device 124 may instead perform the operations of blocks 1114 and 1116 as the associated data (e.g., sizes of packets transmitted over a previous time period) may be more readily available to the network computing device 124 (e.g., from network logs).

Subsequently, the method 1100 advances to block 1118 in which the endpoint computing device 102 determines, as a function of the target quality of service for the service data flow, one or more radio links on which to send the packets. In doing so, and as indicated in block 1120, the endpoint computing device 102 may determine quality of service capabilities of the available radio links. For example, and as indicated in block 1122, the endpoint computing device 102 may determine theoretical (e.g., without regard to congestion, environmental conditions, and/or other factors that may reduce the actual quality of service) quality of service capabilities of the available radio links (e.g., by determining a technology that the radio link is based on, such as 3G, LTE, 5G, etc. and identifying (e.g., from a database of communication technologies and corresponding capabilities) the theoretical capabilities of each radio link). For example, the theoretical latency for an LTE radio link may be defined as 75 milliseconds. As another example, the theoretical latency for an NR radio link may be defined as 20 to 50 milliseconds. As indicated in block 1124, the endpoint computing device 102 may additionally or alternatively determine the present quality of service capabilities of the available radio links (e.g., by querying networking computing devices associated with those radio links and/or by estimating the service capabilities based on packets transmitted or received by the endpoint computing device 102). As indicated in block 1126, the endpoint computing device 102 may measure aggregated throughput of each radio link. Additionally or alternatively, and as indicated in block 1128, the endpoint computing device 102 may estimate the quality of each radio link based on feedback from the physical layer (e.g., data pertaining to received signal strength indicator (RSSI), reference signal received power (RSRP), modulation and coding schemes (MCS), hybrid automatic repeat request (HARQ) retransmission rate, block error rate (BLER), etc.). In some embodiments, the endpoint computing device 102 may estimate the radio link quality based on the number of layer 2 packet retransmissions (e.g., RLC packet retransmissions). As indicated in block 1130, the endpoint computing device 102 may determine the latency of each available radio link.

Figure 12:
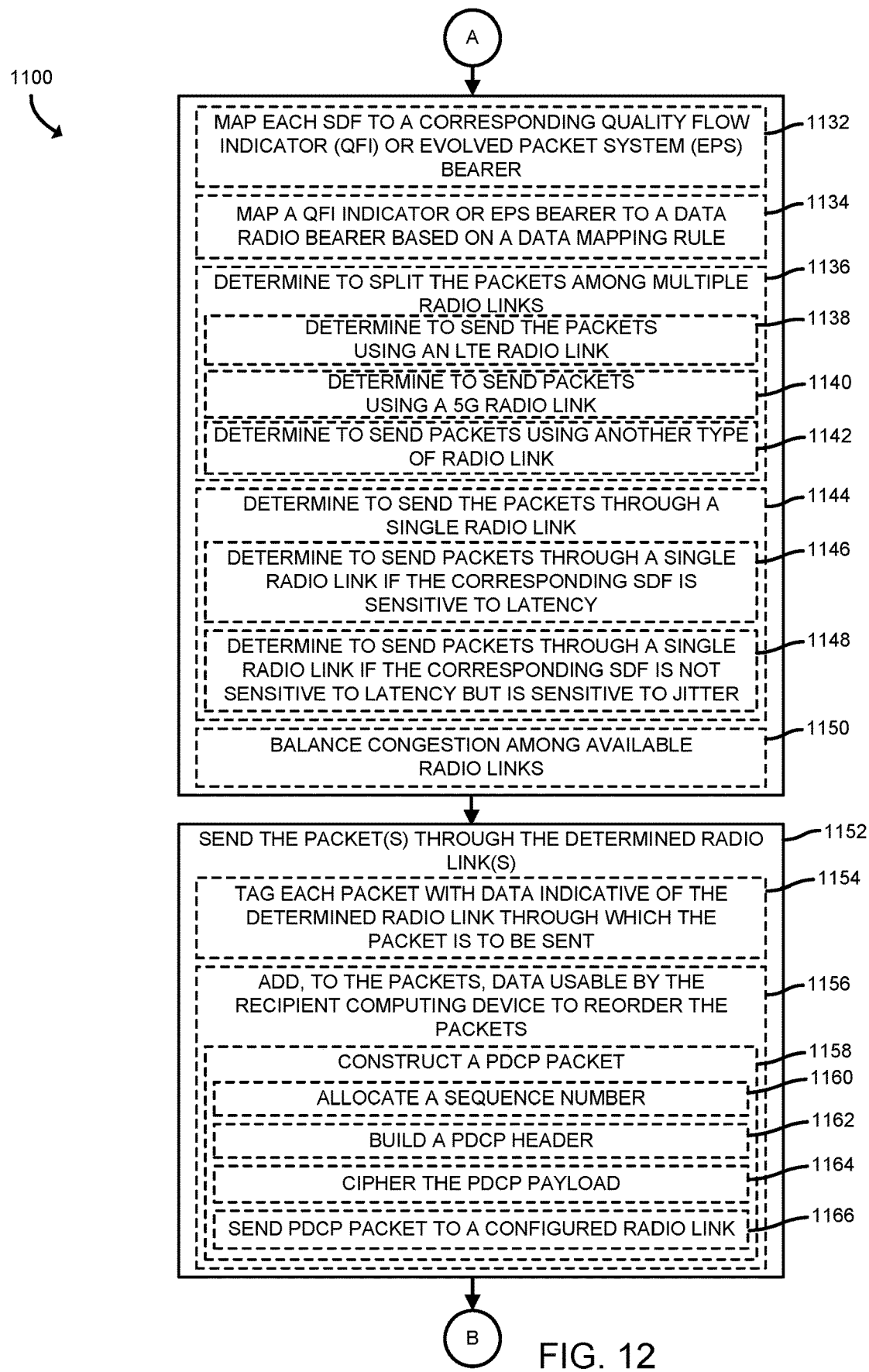

Referring now to FIG. 12, the endpoint computing device 102 may map each service data flow to a corresponding quality flow indicator (QFI), as indicated in block 1132. The endpoint computing device 102 may further map the QFI indicator to a data radio bearer based on a data mapping rule (e.g., in the memory 110), as indicated in block 1134. As indicated in block 1136, the endpoint computing device 102 may determine to split the packets (e.g., the service flow data) among multiple radio links (e.g., if the corresponding application is not sensitive to latency and jitter, meaning the acceptable levels of latency and jitter defined on the target quality of service data would be satisfied even if the SDF was split across multiple radio links). In doing so, the endpoint computing device 102 may determine to send a portion of the packets using an LTE radio link, as indicated in block 1138. As indicated in block 1140, the endpoint computing device 102 may determine to send a portion of the packets using a 5G (e.g., NR) radio link. Additionally or alternatively, the endpoint computing device 102 may determine to send a portion of the packets on a different type of radio link (e.g., 3G, 2G, etc.), as indicated in block 1142. As indicated in block 1144, the endpoint computing device 102 may determine to send the packets associated with a given SDF through a single radio link. For example, the endpoint computing device 102 may determine to send all of the packets of the SDF through a single radio link if the SDF (e.g., the application associated with the SDF) is sensitive to latency (e.g., the target quality of service data indicates a target latency that would likely not be met by splitting the SDF among a low latency radio link and another radio link having a relatively high latency), as indicated in block 1146. Similarly, the endpoint computing device 102 may determine to send the packets through a single radio link if the SDF (e.g., the application associated with the SDF) is sensitive to jitter (e.g., the target quality of service data indicates a target jitter that would likely not be met by splitting the packets among multiple radio links having quality of service capabilities (e.g., latencies) that differ by more than a threshold amount (e.g., the target jitter)), as indicated in block 1148. Further, and as indicated in block 1150, the endpoint computing device 102 may adjust a determination made above in view of existing congestion (e.g., traffic) on each of the radio links. For example, an otherwise high throughput, low latency radio link may presently have a relatively large amount of traffic. As such, rather than selecting that radio link, the endpoint computing device 102 may select a different radio link having lower theoretical capabilities, if doing so would still satisfy the target quality of service for the SDF. In some embodiments, the application associated with the service data flow may determine which radio link the service data flow should use. In such embodiments, the application may provide filter rules (e.g., based on a 5-tuple) and associate the filter rule to a radio link (e.g., an LTE radio link). In such instances, the splitter logic unit 150 may map every packet matching the configured filter to the associated radio link (e.g., the LTE radio link).

Subsequently, in block 1152, the endpoint computing device 102 sends the packets associated with an SDF through the determined radio links for that SDF. In doing so, the endpoint computing device 102 tags each outgoing packet with data indicative of the determined radio link through which the packet is to be sent, as indicated in block 1154. As indicated in block 1156, the endpoint computing device 102 may add, to the packets, data usable by the recipient computing device (e.g., the network computing device 124) to reorder the packets. For example, the endpoint computing device 102 may construct, for a given outgoing packet, a PDCP packet, as indicated in block 1158. In doing so, the endpoint computing device 102 may allocate a sequence number, build a PDCP header, cipher the PDCP payload (e.g., the outgoing packet), and send the PDCP packet to the corresponding radio link, as indicated in blocks 1160, 1162, 1164, and 1166. Subsequently, the method 1100 loops back to block 1102 of FIG. 11 to continue to selectively split SDFs among available radio links based on the target quality of service data for the applications and the capabilities of the available radio links.

Figure 13:
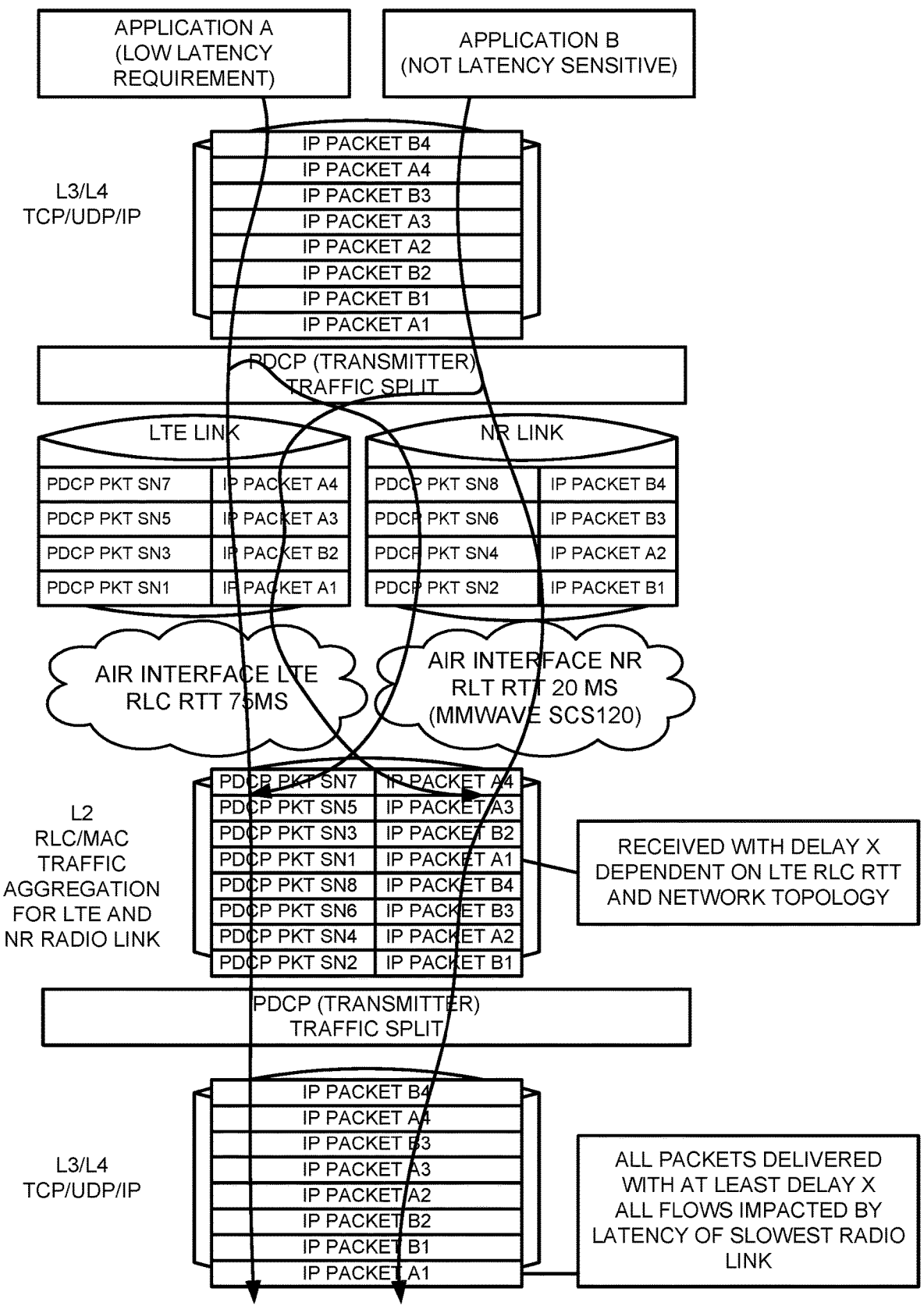
FIG. 13 is a simplified block diagram of an effect of splitting service data flows among multiple radio links in the system of FIG. 1.
Figure 14:
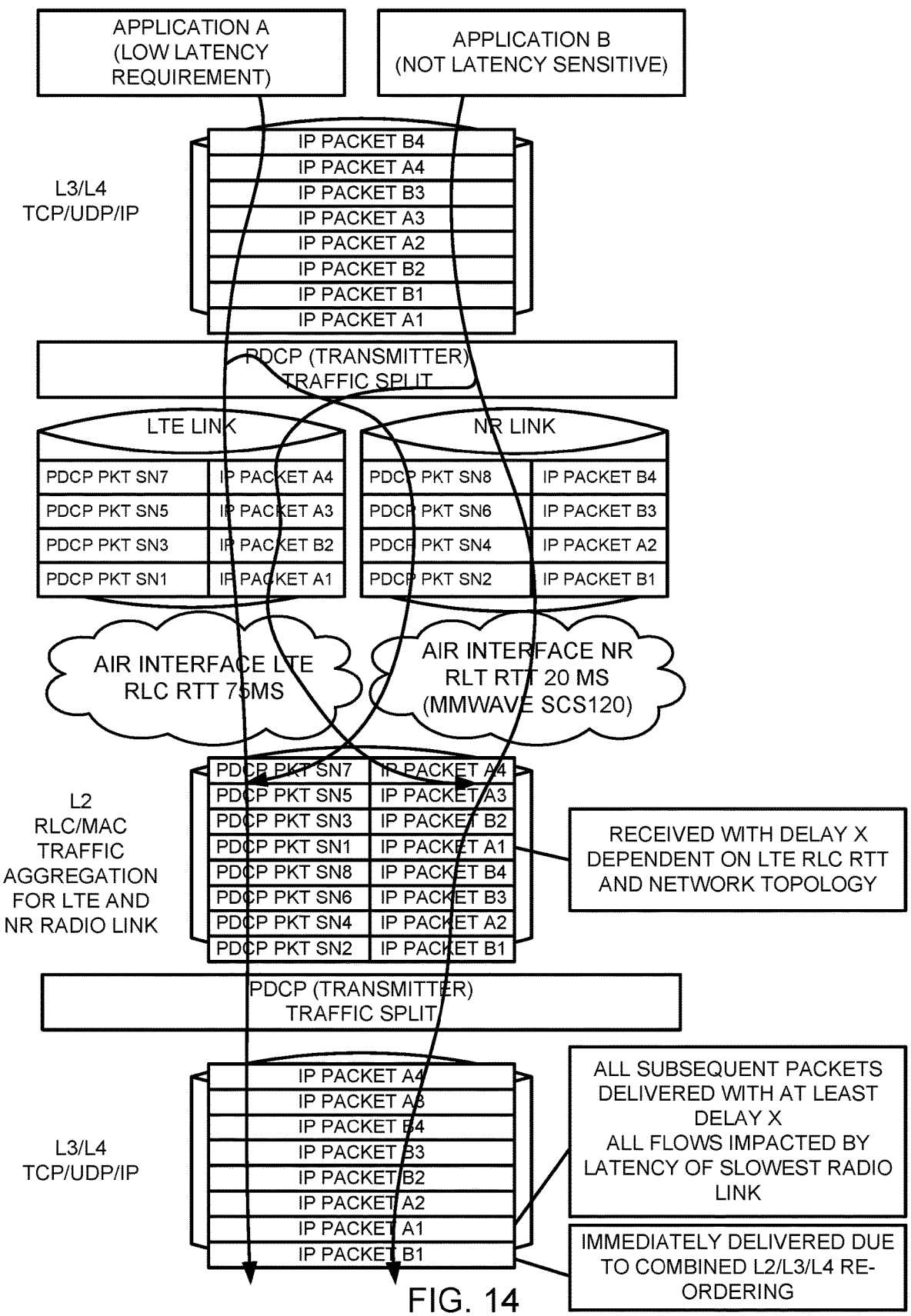
FIG. 14 is a simplified block diagram of an effect of splitting service data flows while utilizing data reordering in the system of FIG. 1.
Figure 15:
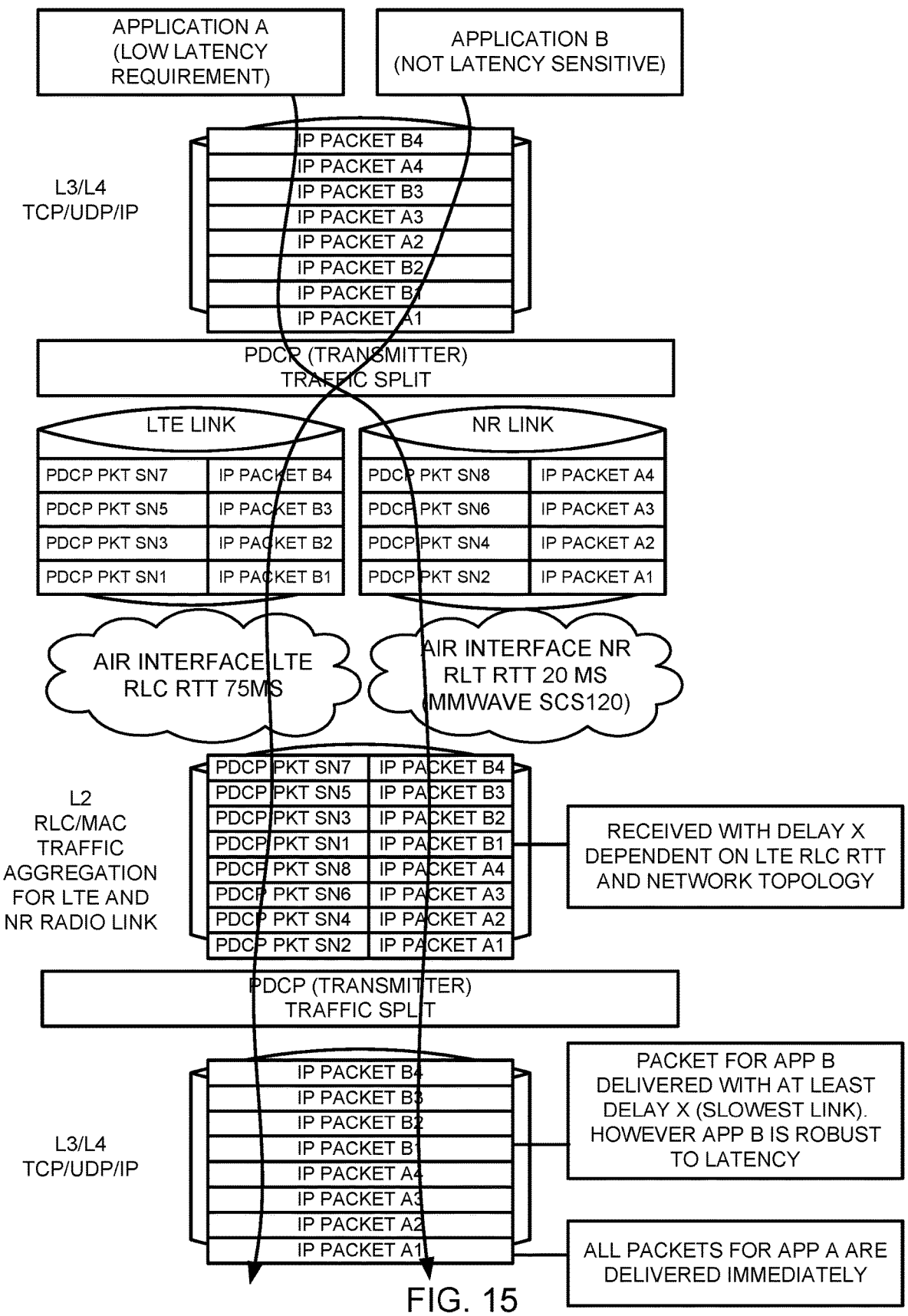
FIG. 15 is a simplified block diagram of an effect of selectively enabling and disabling splitting of service data flows among radio links in the system of FIG. 1.

Referring now to FIG. 13, the effect of splitting service data flows (a service data flow associated with application A and a service data flow associated with application B) among multiple radio links (e.g., an LTE radio link and a NR radio link) is illustrated. As shown, both application A and application B experience delays because their corresponding service data flows are split among the multiple radio links. Referring now to FIG. 14, an improvement in the delivery of packets for application A and application B is provided by performing reordering of packet data, as described with reference to FIGS. 1-8, however, some delay is still incurred due to split in the service data flows among the LTE and NR radio links. Referring now to FIG. 15, by utilizing selective splitting based on target quality of service data, as described relative to FIGS. 9-12, the system 100 determines not to split the service data flows associated with applications A and B and the corresponding packets are delivered with lower delay than in the examples of FIGS. 13 and 14.

In addition to the implementations described above, it should be appreciated that the foregoing systems and methods may implemented in any environment (e.g., smart factories, smart cities, smart buildings, and the like) in which the devices are arranged and interoperate in a manner similar to that described with reference to FIG. 1, though the names of the individual devices may differ from one implementation to the next. For example, in a smart factory, the above systems and methods may improve the accuracy, efficiency, and/or safety with which one or more manufacturing operations are performed, particularly in instances in which the operations are to be performed in real time or near real time (e.g., in which low latency and jitter is of high importance). In a smart city, the above systems and methods may improve the accuracy, efficiency, and/or safety in the operation of traffic control systems, environmental monitoring systems, and/or other automated or semi-automated systems. Likewise, in a smart building, the above disclosure may applied to improve the operations of any systems that rely on sensors to collect and act upon the collected information (e.g., threat detection and evacuation management systems, video monitoring systems, elevator control systems, etc.).

EXAMPLES

Illustrative examples of the technologies disclosed herein are provided below. An embodiment of the technologies may include any one or more, and any combination of, the examples described below.

Example 1 includes a computing device comprising circuitry to identify a service data flow associated with a set of packets to be sent to a recipient computing device; determine a target quality of service for the service data flow; determine, as a function of the target quality of service, one or more radio links on which to send the packets, including determining whether to split the service data flow over multiple radio links; and send the packets through the determined one or more radio links.

Example 2 includes the subject matter of Example 1, and wherein to identify the service data flow comprises to identify, from data present in layer 3 or layer 4 headers of the packets, the service data flow.

Example 3 includes the subject matter of any of Examples 1 and 2, and wherein to determine the target quality of service for the service data flow comprises to determine the quality of service from quality of service data provided by an application associated with the service data flow.

Example 4 includes the subject matter of any of Examples 1-3, and wherein to determine the target quality of service for the service data flow comprises to obtain, from another compute device, quality of service data associated with the service data flow.

Example 5 includes the subject matter of any of Examples 1-4, and wherein to determine the target quality of service for the service data flow comprises to determine, from characteristics of previous communications associated with the service data flow, the target quality of service.

Example 6 includes the subject matter of any of Examples 1-5, and wherein to determine, from characteristics of previous communications associated with the service data flow, the target quality of service, comprises to determine a previous throughput associated with the service data flow.

Example 7 includes the subject matter of any of Examples 1-6, and wherein to determine the previous throughput comprises to cumulate a total size of packets transmitted over a predefined time period in association with the service data flow.

Example 8 includes the subject matter of any of Examples 1-7, and wherein to determine, as a function of the target quality of service, one or more radio links on which to send the packets comprises to determine quality of service capabilities of each radio link of a set of available radio links.

Example 9 includes the subject matter of any of Examples 1-8, and wherein to determine, as a function of the target quality of service, one or more radio links on which to send the packets comprises to determine to send the packets through a single radio link in response to a determination that the target quality of service indicates a sensitivity to latency.

Example 10 includes the subject matter of any of Examples 1-9, and wherein to determine, as a function of the target quality of service, one or more radio links on which to send the packets comprises to determine to send the packets through a single radio link in response to a determination that the target quality of service indicates a sensitivity to jitter.

Example 11 includes the subject matter of any of Examples 1-10, and wherein to determine, as a function of the target quality of service, one or more radio links on which to send the packets comprises to determine to send the packets through multiple radio links in response to a determination that the target quality of service does not indicate a sensitivity to latency or jitter.

Example 12 includes the subject matter of any of Examples 1-11, and wherein to determine, as a function of the target quality of service, one or more radio links on which to send the packets comprises to balance congestion among multiple radio links in a set of available radio links.

Example 13 includes the subject matter of any of Examples 1-12, and wherein to send the packets through the determined one or more radio links comprises to tag each packet with data indicative of a radio link through which the packet is to be sent.

Example 14 includes a computing device comprising an application processor; and a baseband processor to receive network packets; associate a unique data link layer sequence number with each received network packet; and exchange meta-data with the application processor to enable the application processor to reorder one or more of the received network packets.

Example 15 includes the subject matter of Example 14, and wherein the baseband processor is further to retrieve identifying data of a received network packet; associate a unique packet data convergence protocol (PDCP) entity identifier based on the retrieved identifying data; determine whether the received network packet has been received out of order based on a sequence number associated with at least one other previously received network packet; and provide, to the application processor, the unique data link layer sequence number and the unique PDCP entity identifier.

Example 16 includes the subject matter of any of Examples 14 and 15, and wherein the application processor is to reorder data link layer data of the received network packet relative to the at least one other previously received network packet, based on the unique data link layer sequence number and the unique PDCP entity identifier provided by the baseband processor.

Example 17 includes the subject matter of any of Examples 14-16, and wherein to provide the unique data link layer sequence number and the unique PDCP entity identifier to the application processor comprises to transmit the unique data link layer sequence number and the unique PDCP entity identifier via an inter-processor communication driver interface of the baseband processor to another inter-processor communication driver interface of the application processor.

Example 18 includes the subject matter of any of Examples 14-17, and wherein the application processor is further to determine an amount of resources required to reorder a received network packet; determine an amount of available resources of the application processor; and transmit, in response to a determination that the amount of available resources are less than the amount of resources required to reorder the received network packet, a flow control notification to the baseband processor that indicates the baseband processor is to reorder the received network packet.

Example 19 includes a method comprising identifying, by a computing device, a service data flow associated with a set of packets to be sent to a recipient computing device; determining, by the computing device, a target quality of service for the service data flow; determining, by the computing device and as a function of the target quality of service, one or more radio links on which to send the packets, including determining whether to split the service data flow over multiple radio links; and sending, by the computing device, the packets through the determined one or more radio links.

Example 20 includes the subject matter of Example 19, and wherein identifying the service data flow comprises identifying, from data present in layer 3 or layer 4 headers of the packets, the service data flow.

Example 21 includes the subject matter of any of Examples 19 and 20, and wherein determining the target quality of service for the service data flow comprises determining the quality of service from quality of service data provided by an application associated with the service data flow.

Example 22 includes the subject matter of any of Examples 19-21, and wherein determining the target quality of service for the service data flow comprises obtaining, from another compute device, quality of service data associated with the service data flow.

Example 23 includes the subject matter of any of Examples 19-22, and wherein determining the target quality of service for the service data flow comprises determining, from characteristics of previous communications associated with the service data flow, the target quality of service.

Example 24 includes the subject matter of any of Examples 19-23, and wherein determining, from characteristics of previous communications associated with the service data flow, the target quality of service, comprises determining a previous throughput associated with the service data flow.

Example 25 includes the subject matter of any of Examples 19-24, and wherein determining the previous throughput comprises cumulating a total size of packets transmitted over a predefined time period in association with the service data flow.

Example 26 includes the subject matter of any of Examples 19-25, and wherein determining, as a function of the target quality of service, one or more radio links on which to send the packets comprises determining quality of service capabilities of each radio link of a set of available radio links.

Example 27 includes the subject matter of any of Examples 19-26, and wherein determining, as a function of the target quality of service, one or more radio links on which to send the packets comprises determining to send the packets through a single radio link in response to a determination that the target quality of service indicates a sensitivity to latency.

Example 28 includes the subject matter of any of Examples 19-27, and wherein to determining, as a function of the target quality of service, one or more radio links on which to send the packets comprises determining to send the packets through a single radio link in response to a determination that the target quality of service indicates a sensitivity to jitter.

Example 29 includes the subject matter of any of Examples 19-28, and wherein determining, as a function of the target quality of service, one or more radio links on which to send the packets comprises determining to send the packets through multiple radio links in response to a determination that the target quality of service does not indicate a sensitivity to latency or jitter.

Example 30 includes the subject matter of any of Examples 19-29, and wherein determining, as a function of the target quality of service, one or more radio links on which to send the packets comprises balancing congestion among multiple radio links in a set of available radio links.

Example 31 includes the subject matter of any of Examples 19-30, and wherein sending the packets through the determined one or more radio links comprises tagging each packet with data indicative of a radio link through which the packet is to be sent.

Example 32 includes the subject matter of any of Examples 19-31, and further including receiving, with a baseband processor, network packets; associating, with the baseband processor, a unique data link layer sequence number with each received network packet; and exchanging, by the baseband processor, meta-data with an application processor to enable the application processor to reorder one or more of the received network packets.

Example 33 includes the subject matter of any of Examples 19-32, and further including retrieving, by the baseband processor, identifying data of a received network packet; associating, by the baseband processor, a unique packet data convergence protocol (PDCP) entity identifier based on the retrieved identifying data; determining, by the baseband processor, whether the received network packet has been received out of order based on a sequence number associated with at least one other previously received network packet; and providing, by the baseband processor, to the application processor, the unique data link layer sequence number and the unique PDCP entity identifier.

Example 34 includes the subject matter of any of Examples 19-33, and further including reordering, by the application processor, data link layer data of the received network packet relative to the at least one other previously received network packet, based on the unique data link layer sequence number and the unique PDCP entity identifier provided by the baseband processor.

Example 35 includes the subject matter of any of Examples 19-34, and wherein providing the unique data link layer sequence number and the unique PDCP entity identifier to the application processor comprises transmitting the unique data link layer sequence number and the unique PDCP entity identifier via an inter-processor communication driver interface of the baseband processor to another inter-processor communication driver interface of the application processor.

Example 36 includes the subject matter of any of Examples 19-35, and further including determining, by the application processor, an amount of resources required to reorder a received network packet; determining, by the application processor, an amount of available resources of the application processor; and transmit, by the application processor and in response to a determination that the amount of available resources are less than the amount of resources required to reorder the received network packet, a flow control notification to the baseband processor that indicates the baseband processor is to reorder the received network packet.

Example 37 includes one or more machine-readable storage media comprising a plurality of instructions stored thereon that, in response to being executed, cause a computing device to perform the method of any of Examples 19-36.

Example 38 includes a computing device comprising means for performing the method of any of Examples 19-36.

What is claimed is:

1. User equipment comprising:
   communication circuitry;
   machine-readable instructions; and
   programmable circuitry to operate based on the machine-readable instructions to:
   identify a service data flow associated with packets generated by an application of the user equipment;
   determine a quality of service for the service data flow before the packets of the service data flow are to be transmitted by the user equipment; and
   cause the service data flow to be split over multiple access networks available to the user equipment based on comparison of a measurement to a threshold, the measurement associated with at least one of the multiple access networks.

2. The user equipment of claim 1, wherein the programmable circuitry is to obtain the quality of service for the service data flow from another device.

3. The user equipment of claim 1, wherein the programmable circuitry is to subsequently adjust whether the service data flow is to be split over the multiple access networks.

4. The user equipment of claim 1, wherein the measurement is one of a plurality of measurements associated with the multiple access networks.

5. The user equipment of claim 1, wherein the measurement corresponds to a rate measurement.

6. The user equipment of claim 5, wherein the rate measurement corresponds to a block error rate measurement.

7. The user equipment of claim 1, wherein the measurement corresponds to a time measurement associated with data transmission on the at least one of the multiple access networks.

8. At least one article of manufacture comprising computer readable instructions to cause programmable circuitry of user equipment to at least:
   identify a service data flow associated with packets generated by an application of the user equipment;
   determine a quality of service for the service data flow before the packets of the service data flow are to be transmitted by the user equipment; and
   cause the service data flow to be split over multiple access networks available to the user equipment based on comparison of a measurement to a threshold, the measurement associated with at least one of the multiple access networks.

9. The at least one article of manufacture of claim 8, wherein the instructions are to cause the programmable circuitry of the user equipment to obtain the quality of service for the service data flow from another device.

10. The at least one article of manufacture of claim 8, wherein the instructions are to cause the programmable circuitry of the user equipment to subsequently adjust whether the service data flow is to be split over the multiple access networks.

11. The at least one article of manufacture of claim 8, wherein the measurement is one of a plurality of measurements associated with the multiple access networks.

12. The at least one article of manufacture of claim 8, wherein the measurement corresponds to a rate measurement.

13. The at least one article of manufacture of claim 12, wherein the rate measurement corresponds to a block error rate measurement.

14. The at least one article of manufacture of claim 8, wherein the measurement corresponds to a time measurement associated with data transmission on the at least one of the multiple access networks.

15. A method for user equipment, the method comprising:
   identifying a service data flow associated with packets generated by an application of the user equipment;
   determining a quality of service for the service data flow before the packets of the service data flow are transmitted by the user equipment; and
   causing the service data flow to be split over multiple access networks available to the user equipment based on comparison of a measurement to a threshold, the measurement associated with at least one of the multiple access networks.

16. The method of claim 15, wherein the method includes obtaining the quality of service for the service data flow from another device.

17. The method of claim 15, wherein the measurement is one of a plurality of measurements associated with the multiple access networks.

18. The method of claim 15, wherein the measurement corresponds to a rate measurement.

19. The method of claim 18, wherein the rate measurement corresponds to a block error rate measurement.

20. The method of claim 15, wherein the measurement corresponds to a time measurement associated with data transmission on the at least one of the multiple access networks.

* * * * *